United States Patent
Averbuch et al.

(10) Patent No.: US 10,546,200 B2
(45) Date of Patent: Jan. 28, 2020

(54) METHOD, APPARATUS, AND SYSTEM FOR DETECTING A PHYSICAL DIVIDER ON A ROAD SEGMENT

(71) Applicant: HERE GLOBAL B.V., Eindhoven (NL)

(72) Inventors: Alex Averbuch, Buffalo Grove, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 9 days.

(21) Appl. No.: 15/987,610

(22) Filed: May 23, 2018

(65) Prior Publication Data
US 2019/0362162 A1 Nov. 28, 2019

(51) Int. Cl.
| | | |
|---|---|---|
| H04N 7/18 | (2006.01) |
| G06K 9/00 | (2006.01) |
| G01C 21/30 | (2006.01) |
| G06K 9/62 | (2006.01) |
| G06F 16/29 | (2019.01) |
| G06F 16/23 | (2019.01) |

(52) U.S. Cl.
CPC ......... *G06K 9/00798* (2013.01); *G01C 21/30* (2013.01); *G06F 16/2365* (2019.01); *G06F 16/29* (2019.01); *G06K 9/00805* (2013.01); *G06K 9/6262* (2013.01); *G06K 9/6277* (2013.01)

(58) Field of Classification Search
CPC .................................................. G06K 9/00798
USPC ......................................................... 348/158
See application file for complete search history.

(56) References Cited

U.S. PATENT DOCUMENTS

| | | |
|---|---|---|
| 6,516,267 B1 | 2/2003 | Cherveny et al. |
| 8,537,338 B1 | 9/2013 | Medasani et al. |
| 9,140,792 B2 | 9/2015 | Zeng |
| 9,280,711 B2 | 3/2016 | Stein |
| 9,494,438 B1 | 11/2016 | Ichinokawa |
| 9,625,264 B1 * | 4/2017 | Imanishi ............ G01C 21/3638 |
| 10,395,117 B1 * | 8/2019 | Zhang |
| 2009/0138497 A1 | 5/2009 | Zavoli et al. |
| 2017/0277716 A1 | 9/2017 | Giurgiu et al. |
| 2019/0147331 A1 * | 5/2019 | Arditi .................... G06N 20/00 706/20 |

FOREIGN PATENT DOCUMENTS

EP 3130891 A1 2/2017

* cited by examiner

*Primary Examiner* — Leron Beck
(74) *Attorney, Agent, or Firm* — Ditthavong & Steiner, P.C.

(57) ABSTRACT

An approach is provided for detecting a presence of a physical divider on a road segment. The approach, for example, involves determining a number of positive observations of the physical divider on the road segment based on sensor data collected from one or more vehicles traveling the road segment. The approach also involves determining a number of negative observations of the physical divider on the road segment based on the sensor data. The approach further involves calculating a probability of the presence of the physical divider based on the number of the positive observations and the number of the negative observations. The approach further involves updating map data for the road segment to indicate the presence of the physical divider based on determining that the probability of the presence of the physical divider is greater than a threshold value.

20 Claims, 17 Drawing Sheets

FIG. 10B
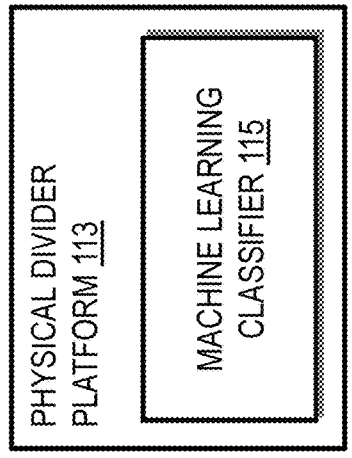
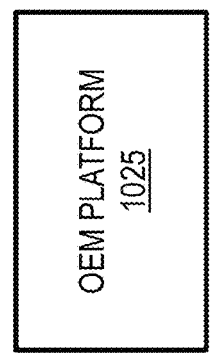
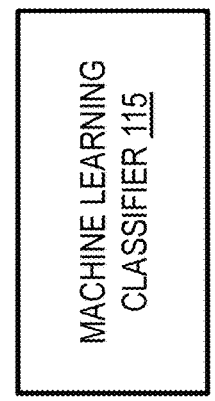
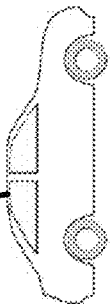
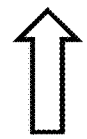
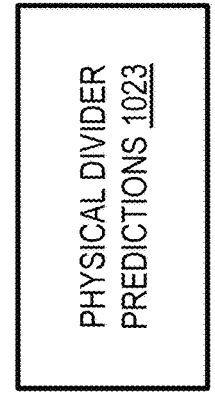

METHOD, APPARATUS, AND SYSTEM FOR DETECTING A PHYSICAL DIVIDER ON A ROAD SEGMENT

BACKGROUND

Providing environmental awareness for vehicle safety, particularly in autonomous driving, has been a primary concern for automobile manufacturers and related service providers. For example, knowing whether physical dividers (e.g., structural separators) exist between travel lanes of a road segment can be an indicator that there is less potential for inter-lane accidents or collisions. Mapping these physical dividers, however, has historically been resource-intensive. Accordingly, service providers face significant technical challenges to more efficiently detect and map physical dividers on road segments.

SOME EXAMPLE EMBODIMENTS

Therefore, there is a need for detecting a physical divider on a road segment.

According to one embodiment, a computer-implemented method for detecting a presence of a physical divider on a road segment comprises determining a number of positive observations of the physical divider on the road segment based on sensor data collected from one or more vehicles traveling the road segment. The method also comprises determining a number of negative observations of the physical divider on the road segment based on the sensor data. The method further comprises calculating a probability of the presence of the physical divider based on the number of the positive observations and the number of the negative observations. The method further comprises updating map data for the road segment to indicate the presence of the physical divider based on determining that the probability of the presence of the physical divider is greater than a threshold value.

According to another embodiment, an apparatus for detecting a presence of a physical divider on a road segment comprises at least one processor, and at least one memory including computer program code for one or more computer programs, the at least one memory and the computer program code configured to, with the at least one processor, cause, at least in part, the apparatus to determine a number of positive observations of the physical divider on the road segment based on sensor data collected from one or more vehicles traveling the road segment. The apparatus is also caused to determine a number of negative observations of the physical divider on the road segment based on the sensor data. The apparatus is further caused to calculate a probability of the presence of the physical divider based on the number of the positive observations and the number of the negative observations. The apparatus is further caused to update map data for the road segment to indicate the presence of the physical divider based on determining that the probability of the presence of the physical divider is greater than a threshold value.

According to another embodiment, a non-transitory computer-readable storage medium for detecting a presence of a physical divider on a road segment carries one or more sequences of one or more instructions which, when executed by one or more processors, cause, at least in part, an apparatus to determine a number of positive observations of the physical divider on the road segment based on sensor data collected from one or more vehicles traveling the road segment. The apparatus is also caused to determine a number of negative observations of the physical divider on the road segment based on the sensor data. The apparatus is further caused to calculate a probability of the presence of the physical divider based on the number of the positive observations and the number of the negative observations. The apparatus is further caused to update map data for the road segment to indicate the presence of the physical divider based on determining that the probability of the presence of the physical divider is greater than a threshold value.

According to another embodiment, an apparatus for detecting a presence of a physical divider on a road segment comprises means for determining a number of positive observations of the physical divider on the road segment based on sensor data collected from one or more vehicles traveling the road segment. The apparatus also comprises means for determining a number of negative observations of the physical divider on the road segment based on the sensor data. The apparatus further comprises means for calculating a probability of the presence of the physical divider based on the number of the positive observations and the number of the negative observations. The apparatus further comprises means for updating map data for the road segment to indicate the presence of the physical divider based on determining that the probability of the presence of the physical divider is greater than a threshold value.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 10A and 10B are diagrams of example architectures for providing machine learning of physical dividers, according to one embodiment;

DESCRIPTION OF SOME EMBODIMENTS

Examples of a method, apparatus, and computer program for providing machine learning of physical dividers using map data and/or vehicle sensor data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
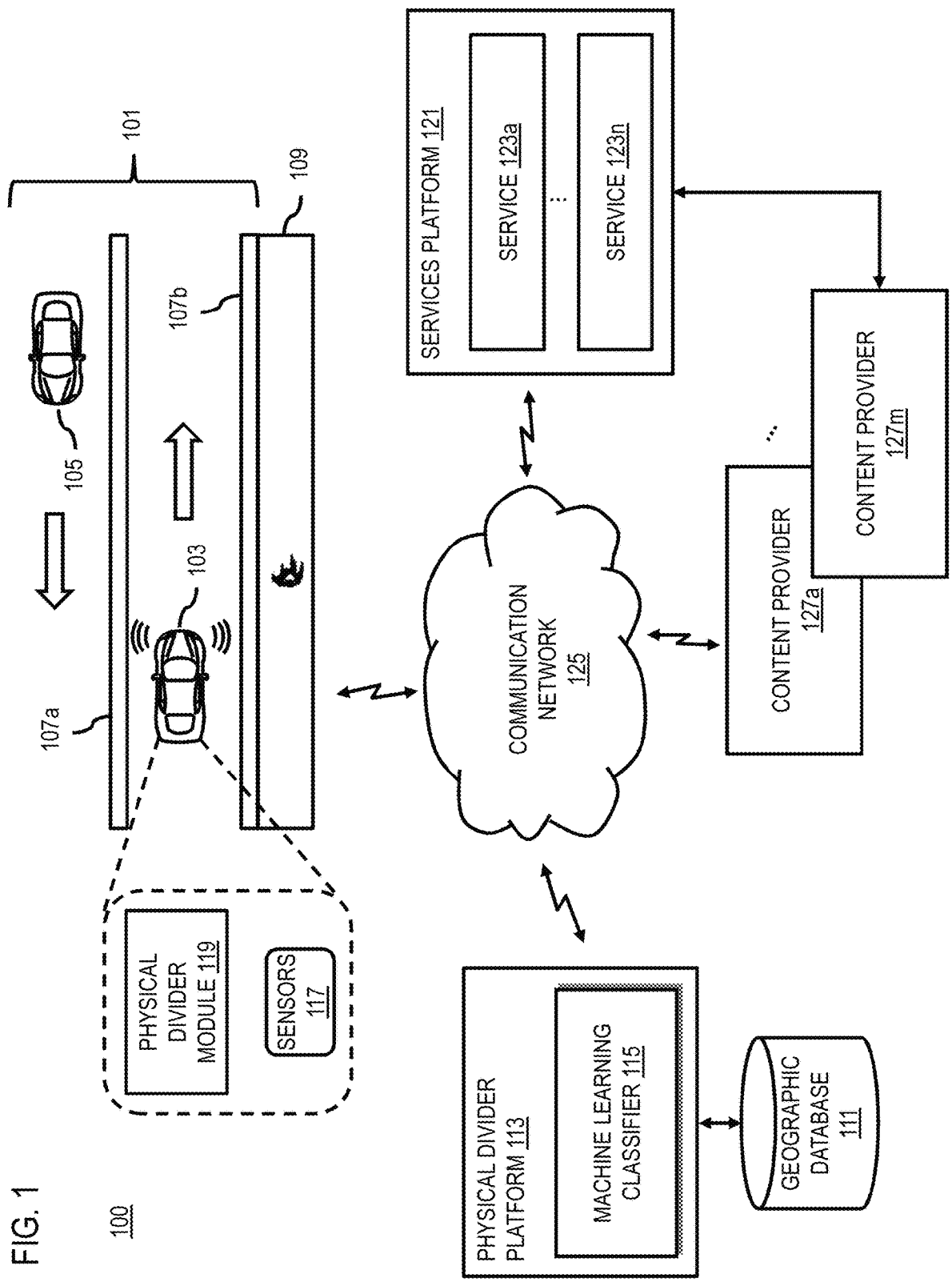
FIG. 1 is a diagram of a system capable of detecting a presence of a physical divider on a road segment, according to one embodiment.

FIG. 1 is a diagram of a system 100 capable of providing machine learning of physical dividers, according to one embodiment. Having knowledge of whether physical dividers are present or absent on a road segment can provide important situational awareness and improved safety to vehicles, particularly autonomous vehicles that operate with reduced or no human driver input. In other words, an understanding of where other cars may potentially be and what they might do is important for an autonomous vehicle to safely plan a route. For example, as shown in FIG. 1, a road 101 may support bi-directional traffic with a first vehicle 103 traveling in one direction and a second vehicle 105 traveling in the opposite direction. In this example, a first physical divider 107a is present between the vehicle travel lanes of the road 101, and a second physical divider 107b is present between the one of the vehicle travel lanes and a pedestrian lane 109 adjacent to the road 101 (also collectively referred to as physical dividers 107). The presence of the physical dividers 107 can improve safety by reducing the probability of oncoming traffic collisions, or collisions with pedestrians or other non-vehicular traffic.

Figure 2:
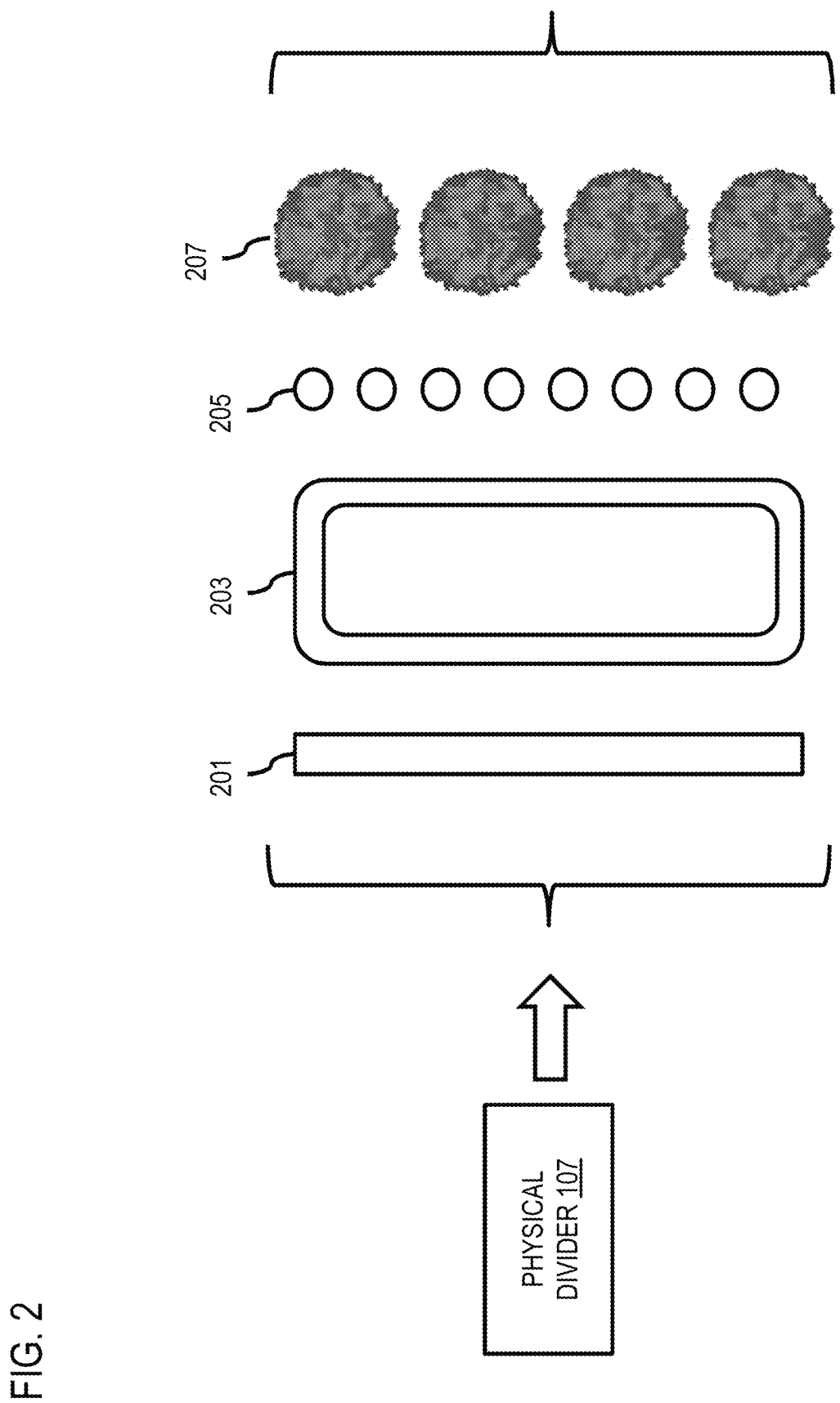
FIG. 2 is a diagram illustrating examples of physical dividers, according to one embodiment.

In one embodiment, a physical divider 107 is a structural separator that is a fixed roadside or median entity that prevents vehicles and/or pedestrians traveling in one lane from crossing into or accessing other lanes of the road (and/or from crossing between different traffic flow directions). The physical divider 107 can be, for instance, a physical barrier or provide enough physical space or clearance between different lanes or traffic flow directions so that potential cross-over traffic is minimized or prevented. FIG. 2 is a diagram illustrating examples of physical dividers. As shown, a physical divider can include, but is not limited to, (1) a solid wall 201 (e.g., a concrete barrier), (2) a median 203 that is sufficiently wide to separate reduce potential crossover traffic to a threshold probability, (3) a row of columns 205, (4) a row of trees 207, etc. It is noted that, in one embodiment, a physical divider 107 can be made of any type material or construction provided that it reduces, minimizes, or prevents potential crossover between travel lanes or traffic flow directions.

Because of the diversity of physical dividers 107 and the variability of their installation along roadways, mapping the presence or absence of physical dividers 107 historically has been a resource-intensive effort, typically employing data collection vehicles to travel the roads for human observers to manually annotate or physical dividers in a map data (e.g., a geographic database 111). As a result, map providers have traditionally been only able to map a small percentage of the physical dividers 107. Therefore, enabling a less-resource intensive and more automated process for detecting physical dividers 107 presents a significant technical problem. Moreover, when detailed mapping of physical dividers 107 may be unavailable, the vehicle may have to navigate using real-time sensing of physical dividers 107. Therefore, the technical challenges also include enabling a real-time or near real-time mapping or detection of physical dividers 107.

To address this problem, a system 100 (e.g., via a physical divider platform 113) of FIG. 1 introduces a capability to detect a presence or absence of a physical divider 107 on a given segment of a road 101 (e.g., a 5-meter segment of the road 101) by positive and negative observations of physical dividers reported by vehicles 103 traveling on the segment of the road 101. In one embodiment, as the vehicles 103 travel on the road 101, they collect sensor data to determine whether each individual vehicle 103 detects a possible presence of a physical divider 107 on the road segment. This results in producing a stream of physical divider (PD) signals that indicate whether there is a positive observation of the physical divider 107 (e.g., "PD ON" signal indicating that the reporting vehicle 103 has detected a physical divider 107 using, for instance, its sensor data) or there is a negative observation (e.g., "PD OFF" signal indicating that there the reporting vehicle 103 has not detected a physical divider 107 using, for instance, its sensor data). In one embodiment, the PD signal stream can be associated with a path or probe trajectory (e.g., location trace data collected by one or more location sensors of the vehicle 103) so that the signals can be map matched or correlated to a position in the road segment. However, because each PD signal stream represents the observations or just one corresponding vehicle 103, the system 100 may sometimes receive conflicting data where one PD signal stream from a first vehicle 103 shows a positive observation while another PD signal stream from a second vehicle 105 shows a negative observation for the same road segment. This conflict or data variability can be due to any number of reasons including but not limited to differences in sensor sensitivity, differences environmental conditions at the time of each observation, random signal variability, etc. Regardless of the cause, this potential for conflicting physical divider data creates a significant technical challenge for the system 100 to overcome to accurately determine the presence or absence of a physical divider 107.

To address this additional problem, the physical divider platform 113 aggregates PD signal streams or equivalent sensor data (e.g., positive and negative physical divider observations) from many different vehicles 103 for each road segment of interest (e.g., each 5-meter or other sized segment of a road 101 mapped in the geographic database 111). In one embodiment, at least one vehicle (e.g., vehicle 103) can include a physical divider module 119 for performing one or more functions associated detecting physical dividers alone or in combination with the physical divider platform 113. The physical divider platform 113 can then calculate a probability that a physical divider 107 exists on the road segment based on the positive and negative observations determined from the PD signal streams (e.g., by evaluating the numbers of positive and negative observations). The system 100 can then flag the road segment in the digital map (e.g., in the geographic database 111) as having a physical divider 107 if the calculated probability is above a threshold value. In one embodiment, the physical divider platform 113 can use ground truth data (e.g., annotated data indicating a known presence or absence of physical dividers 107 on a variety of reference or ground truth road segments).

In one embodiment, the physical divider platform 113 can use the determined presence or absence of a physical divider 107 (or the probability of the presence or absence of the physical divider 107) to determine the probability of other related characteristics such as, but not limited to: (1) the probability of oncoming or opposite traffic on the segment of interest (OPPO) (e.g., if there is no physical divider 107 between opposite traffic flows on the segment, the probability of oncoming traffic or a collision with oncoming traffic can be higher); and (2) the probability of the presence of vulnerable road users (VRU) (e.g., if there is no physical divider 107 between vehicular and non-vehicular traffic, then there is a greater possibility of a possible collection with VRU's, e.g., pedestrians, bicyclists, etc.). In one embodiment, the physical divider platform 113 can predict the probability of a physical divider 107, the probability threshold for classifying whether positive/negative observations indicate a detected physical divider 107, and/or any of the other characteristics that are related to or associated with the presence/absence of a physical divider 107 directly using a trained machine learning model 115 (e.g., Random Forest, Decision Tree, Neural Net, or equivalent).

In yet another embodiment, the physical divider platform 113 can use a rule-based approach applied on the predicted presence/absence of a physical divider 107 to predict the other characteristics. For example, if there is a no physical divider 107 predicted on the segment and the segment supports bi-directional traffic (e.g., as determined from map data stored in the geographic database 111), then the physical divider platform 113 can also predict that OPPO and VRU probabilities are high. It is noted that this rule is provided by way of illustration and not as a limitation. It is contemplated that the physical divider platform 113 can use any equivalent process or means to determine OPPO, VRU, and/or any other related characteristics from a predicted presence/absence of a physical divider 107 on a segment of interest.

Figure 3:
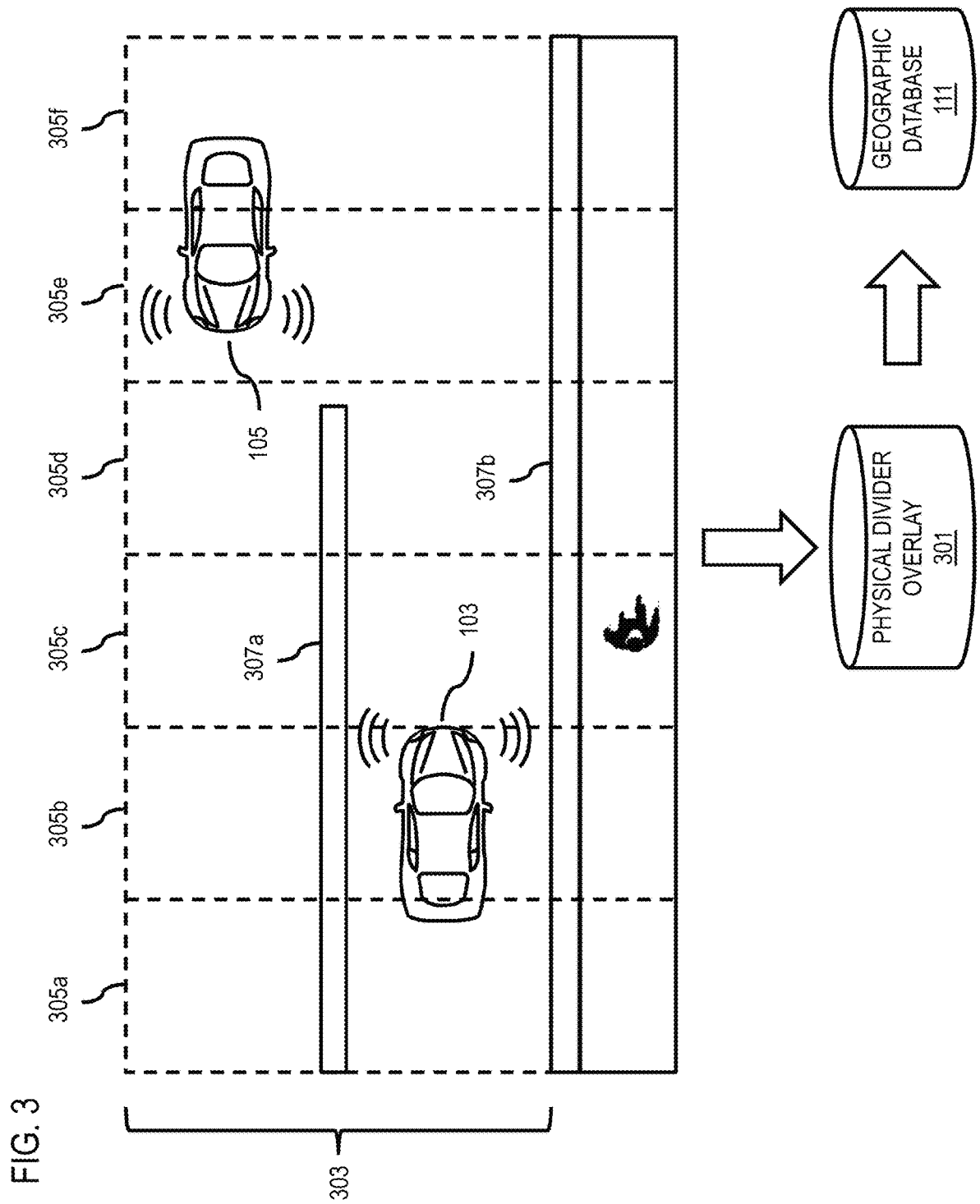
FIG. 3 is a diagram illustrating a process for creating a physical divider overlay for segments of a road, according to one embodiment.

In one embodiment, the physical divider platform 113 segments each of road represented in a map database (e.g., the geographic database 111) into segments of a predetermined length (e.g., 5-meter segments). Then, the physical divider platform 113 can aggregate PD signal or other sensor data from vehicles on the respective segments to make physical divider predictions for each segment of the road separately or independently. FIG. 3 is a diagram illustrating an example process for creating a physical divider overlay 301 for segments of a road 303, according to one embodiment. In one embodiment, the physical divider overlay 301 is a data structure that can be associated with the geographic database 111. The physical divider overlay 301 stores, for instance, data records indicating a presence/absence of a physical divider 107 determined according to the embodiments described herein, associated thresholds, OPPO, VRU, and/or other related attributes in association with corresponding segments of the road 303.

As shown, the physical divider platform 113 segments the road 303 into segments 305*a*-305*f* (also collectively referred to as segments 305). The length of each segment provides for a corresponding level of granularity of the detected physical dividers. For example, a default length of the segments 305 can be 5-meters so that each segment 305 represents a 5-meter long portion of the road 303. In one embodiment, shorter segment lengths can be used if a higher resolution of detection of the physical divider 307*a*-307*b* is desired, and longer segment lengths can be used to reduce memory storage requirements. The physical divider platform 113 can then aggregate positive and negative observations of physical dividers from the sensor data/PD signals from the reporting vehicles (e.g., vehicles 103 and 105) as the vehicles traverse each segment 305*a*-305*f* of the road 303.

In one embodiment, based on the collected positive and negative observations of physical dividers for each of the road segments 305*a*-305*f*, the physical divider platform 113 calculates the probability of the presence or absence of the physical dividers 307*a*-307*b*. The physical divider platform 113 can then compare the calculated probabilities against a threshold value to output a presence (e.g., probability>threshold) or absence (e.g., probability<threshold) of respective physical divider for each segment 305 to store in the physical divider overlay 301 (e.g., update map data to indicate presence/absence of a physical divider or a road segment). Table 1 below illustrates an example of the physical divider determinations made for road segments 305a-305f with respect to physical dividers 307a and 307b (e.g., occurring on different sides of the road 303 and evaluated independently):

TABLE 1

| Segment | Physical Divider 307a | Physical Divider 307b |
|---|---|---|
| 305a | Present | Present |
| 305b | Present | Present |
| 305c | Present | Present |
| 305d | Present | Present |
| 305e | Absent | Present |
| 305f | Absent | Present |

In one embodiment, the predicted physical divider 107 can then be used to determine how to operate an autonomous vehicle. For example, if a physical divider 107 is predicted to be present based on positive and negative observations of a physical divider on a road segment (e.g., because no previously determined ground truth data on physical dividers is available for the road segment), then a more autonomous operation of the vehicle can be disabled, and the driver is expected to drive in more of a manual mode (e.g., requiring the driver to hold the steering wheel as the vehicle operates otherwise in autonomous mode, or to disable some or all autonomous operations). In one embodiment, other use cases include updating the physical divider overlay 301 and/or geographic database 111 with the newly detected physical dividers. It is noted that these uses cases are provided by way of illustration and not as limitations. Accordingly, it is contemplated that the determined physical divider information and/or related attributes (e.g., OPPO, VRU, etc.), can be used for any other use case, application, and/or service.

Figure 4:
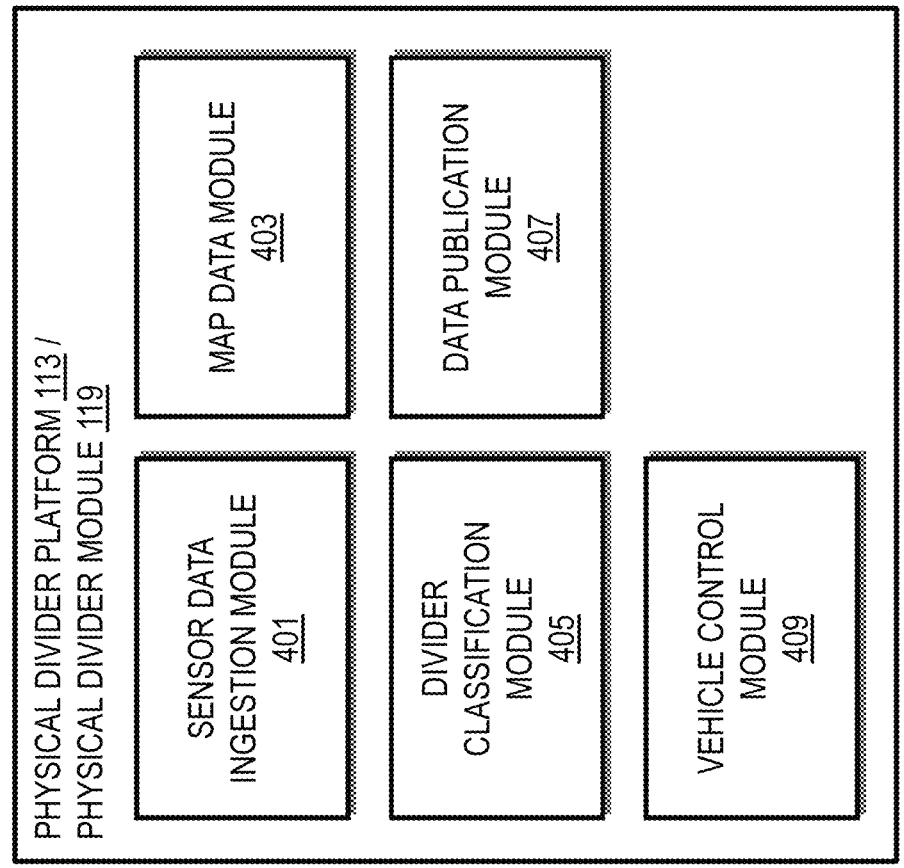
FIG. 4 is a diagram of the components of a physical divider platform, according to one embodiment.

FIG. 4 is a diagram of the components of a physical divider platform 113 and/or physical divider module 119, according to one embodiment. By way of example, the physical divider platform 113 and/or physical divider module 119 includes one or more components for detecting a presence of a physical divider on a road segment according to the various embodiments described herein. It is contemplated that the functions of these components may be combined or performed by other components of equivalent functionality. In this embodiment, the physical divider platform 113 and/or physical divider module 119 include a sensor data ingestion module 401, a map data module 403, a divider classification module 405, a data publication module 407, and a vehicle control module 409. The above presented modules and components of the physical divider platform 113 and/or physical divider module 119 can be implemented in hardware, firmware, software, or a combination thereof. Though depicted as separate entities in FIG. 1, it is contemplated that the physical divider platform 113 and/or physical divider module 119 may be implemented as a module of any of the components of the system 100 (e.g., a component of the vehicle 103, services platform 121, services 123a-123n (also collectively referred to as services 123), etc.). In another embodiment, one or more of the modules 401-409 may be implemented as a cloud-based service, local service, native application, or combination thereof. The functions of the physical divider platform 113, physical divider module 119, and modules 401-409 are discussed with respect to FIGS. 5-11B below.

Figure 5:
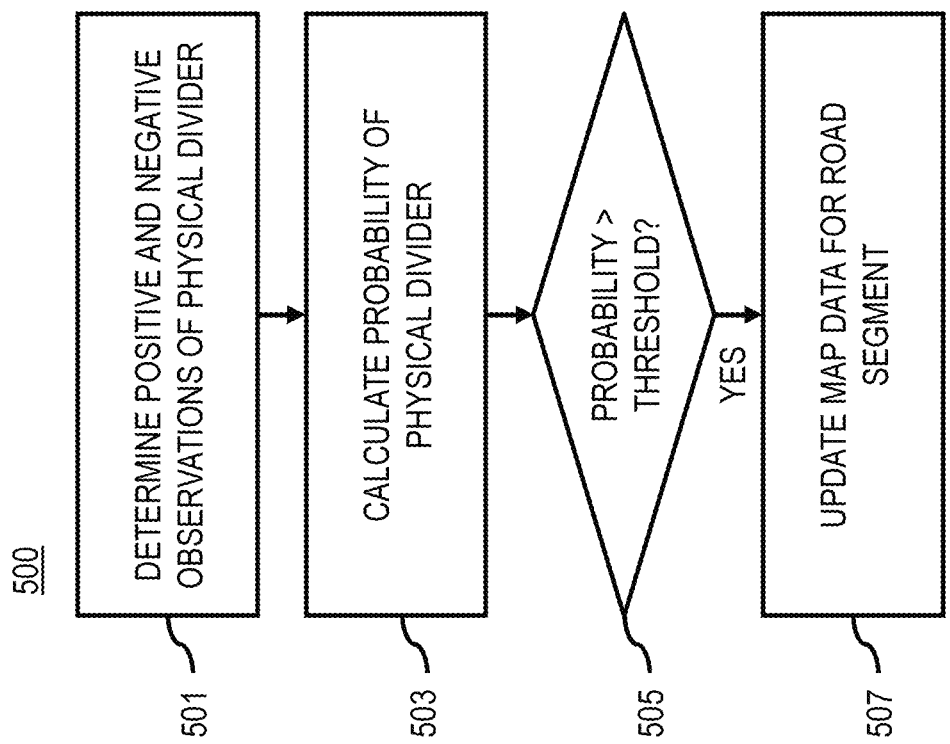
FIG. 5 is a flowchart of a process for detecting a physical divider on a road segment, according to one embodiment.
Figure 6:
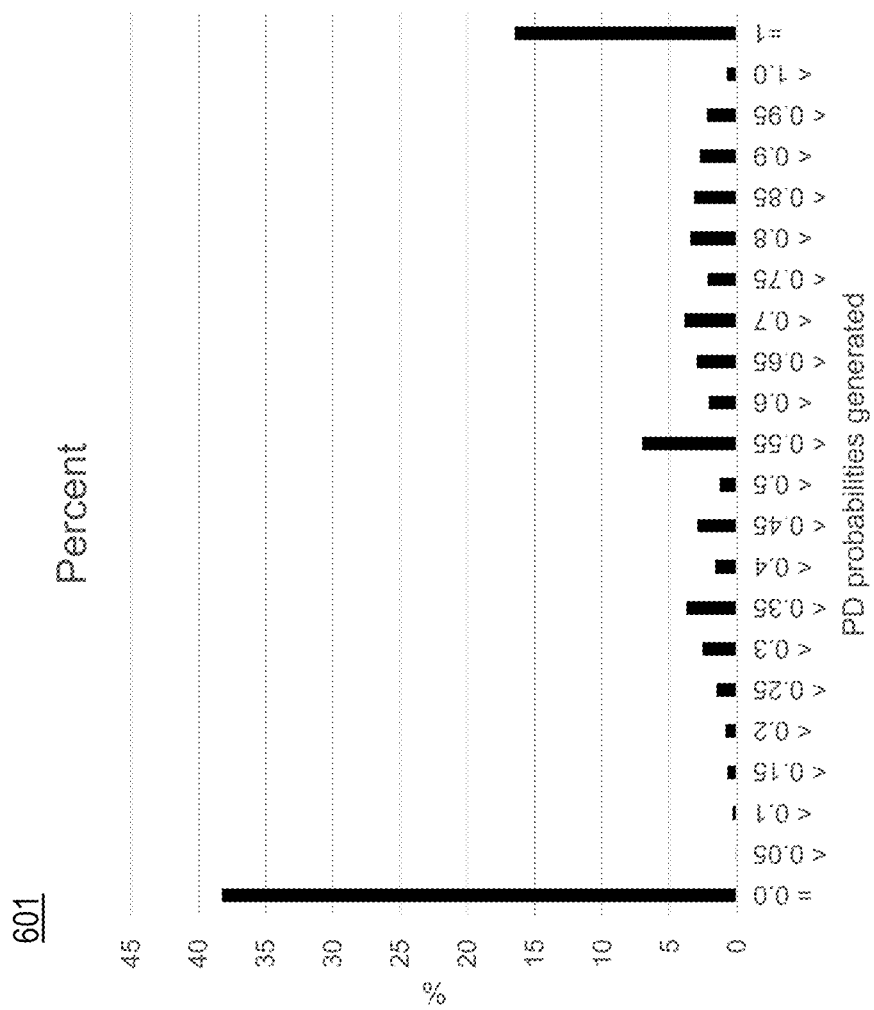
FIG. 6 is a diagram illustrating a graph of example physical divider probabilities, according to one embodiment.
Figure 14:
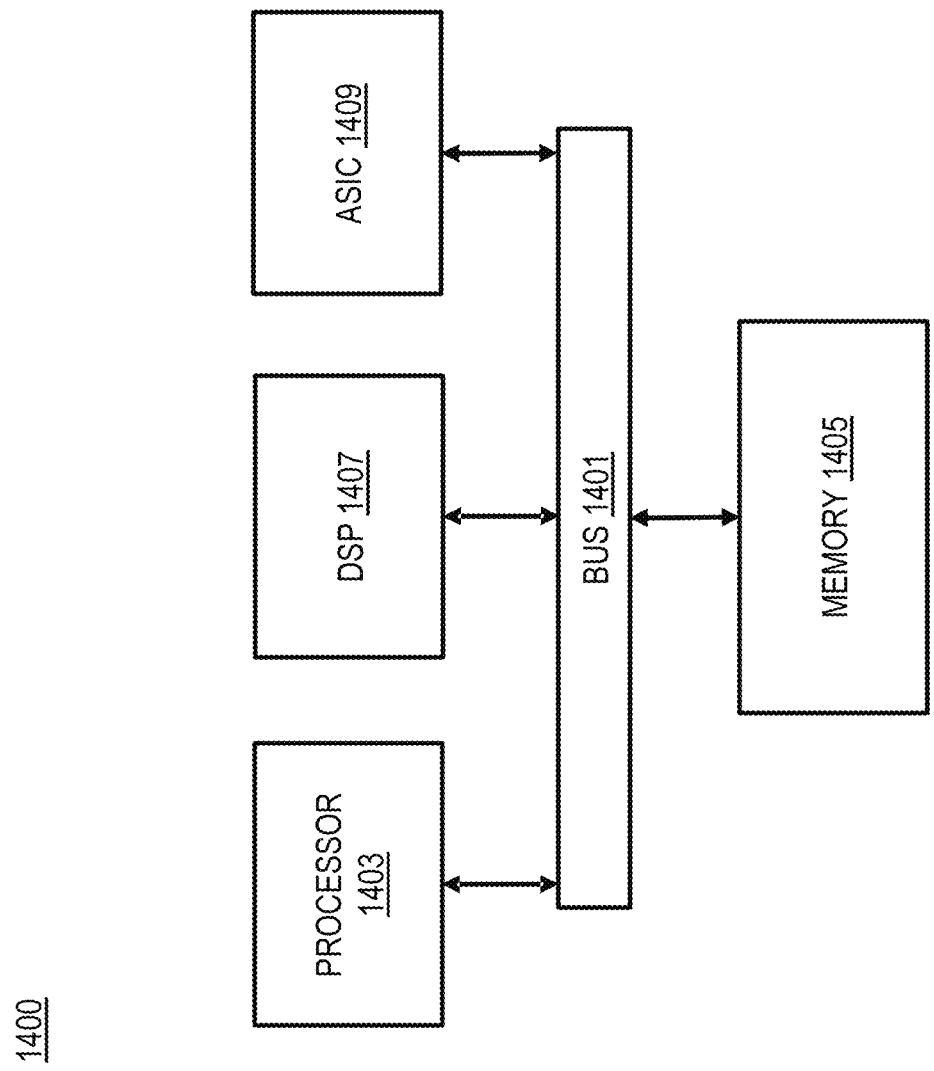
FIG. 14 is a diagram of a chip set that can be used to implement an embodiment.

FIG. 5 is a flowchart of a process for detecting a physical divider on a road segment, according to one embodiment. In various embodiments, the physical divider platform 113, physical divider module 119, and/or any of the modules 401-409 may perform one or more portions of the process 500 and may be implemented in, for instance, a chip set including a processor and a memory as shown in FIG. 14. As such, physical divider platform 113, physical divider module 119, and/or any of the modules 401-409 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In step 501, the sensor data ingestion module 401 determines a number of positive observations of a physical divider on a road segment and a number of negative observations of the physical divider on the road segment. As noted above, the physical divider platform 113 can segment a road into discrete segments of a predetermined length (e.g., 5-meters) to facilitate processing and representation in the geographic database 111. In this case, for each segment of road, the sensor data ingestion module 401 extracts raw data collected from vehicle sensors (e.g., camera, radar, LiDAR, etc.) of vehicles traveling on the segment of interest. The raw data, for instance, can contain multiple traces or probe trajectories (e.g., a sequence of time-stamped location points describing a traveled path) from multiple reporting vehicles 103. The probe trajectories further include PD signal stream data (e.g., physical divider flags—PD ON and PD OFF—sequenced in time and correlated to the respective probe trajectories) for each of the multiple reporting vehicles 103. The PD signal streams, for instance, represent individual physical divider predictions based on the sensor data of each of the reporting vehicles 103. In one embodiment, these individual predictions can be computed as described with respect to the machine learning process of FIG. 7 (described below) or equivalent.

In one embodiment, the traces or probe trajectories of the sensor data are map matched against the digital map of the geographic database 111 to associate them with map road links. In this way, the sensor data ingestion module 401 can query the map matched data for the sensor data or traces corresponding to each road segment of interest for processing to detect physical dividers. In one embodiment, the sensor data can be map matched using a path-based map matcher. The reporting vehicle's direction of travel can be inferred from the time stamp and location points (e.g., GPS points) in the traces.

In embodiments where the traces include PD signal streams, the data ingestion module can extract the physical divider flags (e.g., PD ON and PD OFF) for each 5-meter segment of road to determine positive or negative observations on a segment by segment basis. For example, to determine positive observations of a physical divider, the data ingestion module 401 extracts road segments on which physical dividers have been observed (positive observations, i.e., PD ON). The following pairs of messages or equivalent in the sensor data are then used to identify positive physical divider observations in the sensor data collected from vehicles that traveled the road segment:

(BEGIN/INITIAL, is Physical Divider=True)→(BEGIN/INITIAL, isPhysicalDivider=False)

(BEGIN/INITIAL, is Physical Divider=True)→(END/CANCEL, isPhysicalDivider=False)

In other words, the positive observations are extracted by segmenting a portion of the plurality of probe trajectories that corresponds to the road segment of interest. The portion to segment begins with a positive flag (e.g., a flag indicating a positive observation or a beginning or a positive observation such as "BEGIN/INITIAL, is Physical Divider=True") and ends with a negative flag (e.g., a flag indicating an end of the positive observation such as "BEGIN/INITIAL, is Physical Divider=True" or "END/CANCEL, isPhysicalDivider=False" as determined from the plurality of physical divider flags in the trajectories).

The process for determining negative observations in the sensor data is similar. For example, the data ingestion module 401 extracts road segments on which the lack of physical dividers has been explicitly identified (e.g., with flags) or implicitly implied (e.g., paths where a vehicle passed but made no physical divider report) to represent negative observations. In one embodiment, the data ingestion module 401 uses the following pairs of messages or equivalent to extract explicitly identified negative physical divider observations for the sensor data:

(BEGIN/INITIAL, is Physical Divider=False)→(BEGIN/INITIAL, isPhysicalDivider=True)

(BEGIN/INITIAL, is Physical Divider=False)→(END/CANCEL, isPhysicalDivider=False)

In other words, the negative observations are extracted by segmenting a portion of the plurality of probe trajectories that corresponds to the road segment. The portion begins, for instance, with a negative flag (e.g., a flag indicating a beginning of the negative observation such as "BEGIN/INITIAL, is Physical Divider=False" as determined from the plurality of physical divider flags in the trajectories) and ends with a negative positive divider flag as determined from the plurality of physical divider flags (e.g., a flag indicating an end of the positive observation such as "BEGIN/INITIAL, is Physical Divider=False" or "END/CANCEL, isPhysicalDivider=False" as determined from the plurality of physical divider flags in the trajectories).

In one embodiment, the reporting vehicles are configured to report positive or negative observations only when they are in a lane adjacent to the physical divider (e.g., left-most lane when the physical divider is on the left side of the road or the right-most lane when the physical divider is on the right side of the road). Alternatively, if the vehicles are configured to report observations regardless of lane position and if the such filtering is desired by the by physical divider platform 113, the data ingestion module 401 can filter the positive observations, the negative observations, or a combination thereof based on determining that the one or more vehicles are farther than a distance threshold from the physical divider on the road segment. By way of example, the distance threshold can be based on the physical dimensions of a travel lane adjacent to the physical divider or any other pre-determined distance.

After obtaining the positive and negative observations of the physical divider from the sensor data as described above (e.g., filtered or unfiltered by lane distance), the data ingestion module 401 can determine a total count or number of positive and negative observations for the given road segment.

In step 503, the divider classification module 405 then calculates a probability of the presence of the physical divider or a given road segment based on the number of the positive observations and the number of the negative observations. It is contemplated that the divider classification module 405 can use any function and/or weighting for the positive and/or negative observations physical divider observations to calculate the probability. On example function includes but is not limited to calculated based on a ratio of the number of positive observations to a total number of the positive observations and the negative observations as follows:

PD probability=positive PD count/(negative PD count+positive PD count)

where PD probability is the probability that a physical divider exists or is present on a road segment, positive PD count is the number of positive physical divider observations determined from the sensor data for the road segment, and negative PD count is the number of negative physical divider observations for the road segment.

In one embodiment, if PD probability>threshold (step 505), then divider classification module 405 determines that a physical divider is present for that road segment (e.g., 5-meter segment) and updates the map data (e.g., records in the geographic database 111) for the road segment to indicate the presence of the physical divider (step 507). Effectively, this update implies that the probability for opposing traffic on that road segment is low. Based on this data, an autonomous vehicle traveling on that segment can switch to self-driving mode.

In one embodiment, the divider classification module 405 can calculate the threshold value based on ground truth data indicating a known presence, a known absence, or a combination thereof of a plurality of reference physical dividers on a plurality of reference road segments. For example, the divider classification module 405 can process the ground truth data to calculate PD probabilities for various 5-meter road segments as shown in the graph 601 in FIG. 6. In this example, the graph 601 illustrates the percentage of all computed road segments that fall under bins for each calculated PD probability with peaks at the bin for a probability of 0 (e.g., segments with 0 positive count—PD OFF only), and the bin for a probability of 1 (e.g., segments with only positive counts—PD ON only). However, the inner bins also contain entries which can suggest that a carefully selected threshold that balances the tradeoff between correct and incorrect predictions can be determined. Table 1 below illustrates an example of different possible cut-off probabilities against correct predictions. It is noted that the illustrated numbers are provided for illustration and that actual numbers can be generated from analysis of ground truth data as described above. A system user can then select a probability threshold based on a target prediction accuracy.

TABLE 1

| Cut-Off Probability (e.g., Threshold) | Percent Correct Predictions |
| --- | --- |
| 0 | 50% |
| <0.1 | 80% |
| <0.2 | 85% |
| <0.3 | 90% |
| <0.4 | 85% |
| <0.5 | 80% |
| <0.6 | 75% |

TABLE 1-continued

| Cut-Off Probability (e.g., Threshold) | Percent Correct Predictions |
|---|---|
| <0.7 | 70% |
| <0.8 | 65% |
| <0.9 | 60% |
| 1 | 50% |

Figure 7:
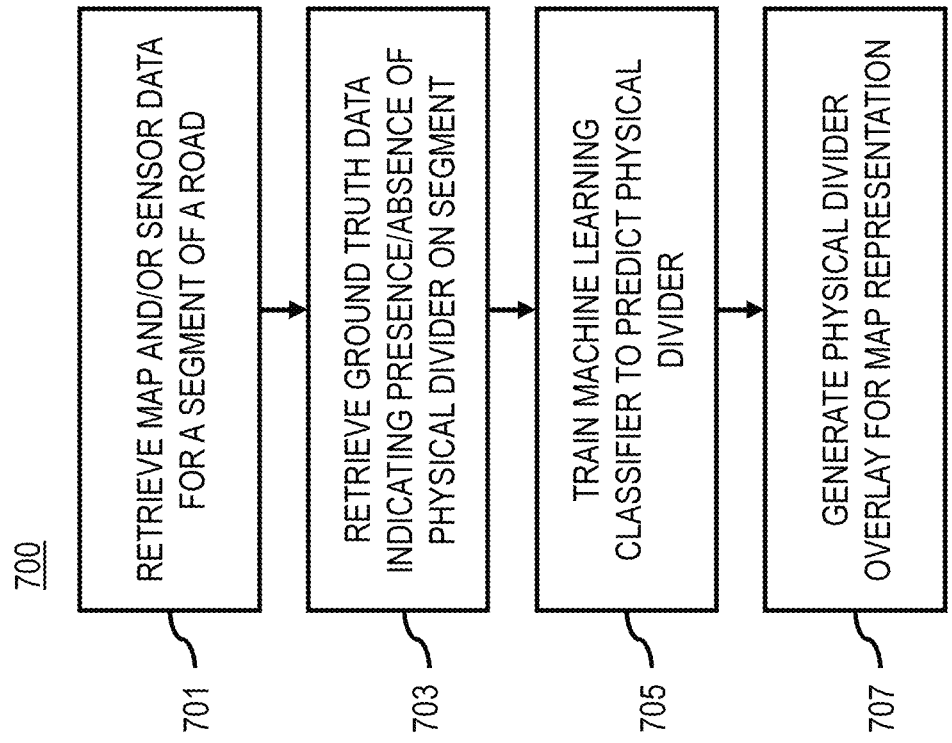
FIG. 7 is a flowchart of a process for providing machine learning of physical dividers, according to one embodiment.

In one embodiment, the process 500 of FIG. 5 above uses positive and negative physical divider observations generated from PD signal streams collected various vehicles. As previously described the PD signal streams include per vehicle predictions of PD ON (e.g., physical divider detected by a reporting vehicle 103) or PD OFF (e.g., physical divider not detected). It is contemplated that the embodiments of the process 500 can use any process for generating the PD signal streams including but not limited to the process as described with respect to FIG. 7. FIG. 7 is a flowchart of an example process for providing machine learning of physical dividers that can be used for generating a PD signal stream, according to one embodiment. In various embodiments, the physical divider platform 113, physical divider module 119, and/or any of the modules 401-409 may perform one or more portions of the process 700 and may be implemented in, for instance, a chip set including a processor and a memory as shown in FIG. 14. As such, physical divider platform 113, physical divider module 119, and/or any of the modules 401-409 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps. More specifically, the process 700 describes a process for collecting map and/or vehicular sensor data to train a machine learning model (e.g., machine learning model 115) to predict physical dividers for a given road segment.

In step 701, the physical divider platform 113 can use any combination of map and/or vehicular sensor data to create a training data set for training the machine learning model 115. In one embodiment, the composition of the training data set can be based on a target level of prediction accuracy. For example, retrieving both map data and sensor data can potentially provide for increase predictive accuracy over either type of data individually. However, when the target predictive accuracy can be achieved by using map data or sensor data alone, the physical divider platform 113 can reduce the resource-burden associated with having to collect both datasets.

In one embodiment, the sensor data ingestion module 401 can be used to retrieve vehicular sensor data, and the map data module 403 can be used to retrieve map data for given segment of a road. As noted above, the physical divider platform 113 can segment a road into discrete segments of a predetermined length (e.g., 5-meters) to facilitate processing. In this case, for each segment of road, the sensor data ingestion module 401 extracts raw data collected from vehicle sensors (e.g., camera, radar, LiDAR, etc.) of vehicles traveling on the segment of interest. For example, the raw sensor data can include, but is not limited to, a cross-sensor consistency distribution (e.g., minimum, maximum, mean, standard deviation, or other statistical parameter of the distribution can be used), a physical divider distance distribution (e.g., also minimum, maximum, mean, standard deviation, or other statistical parameter of the distribution can be used), a height of the physical divider 107, a vehicle speed, a physical divider type (e.g., see examples of FIG. 3), a physical divider sample point count, or a combination thereof. It is contemplated that any sensed parameter of the vehicle, the physical divider 107, or the road segment (e.g., weather, time of day, visibility, etc.) can be collected as raw sensor data for processing by the sensor data ingestion module 401.

Figure 8:
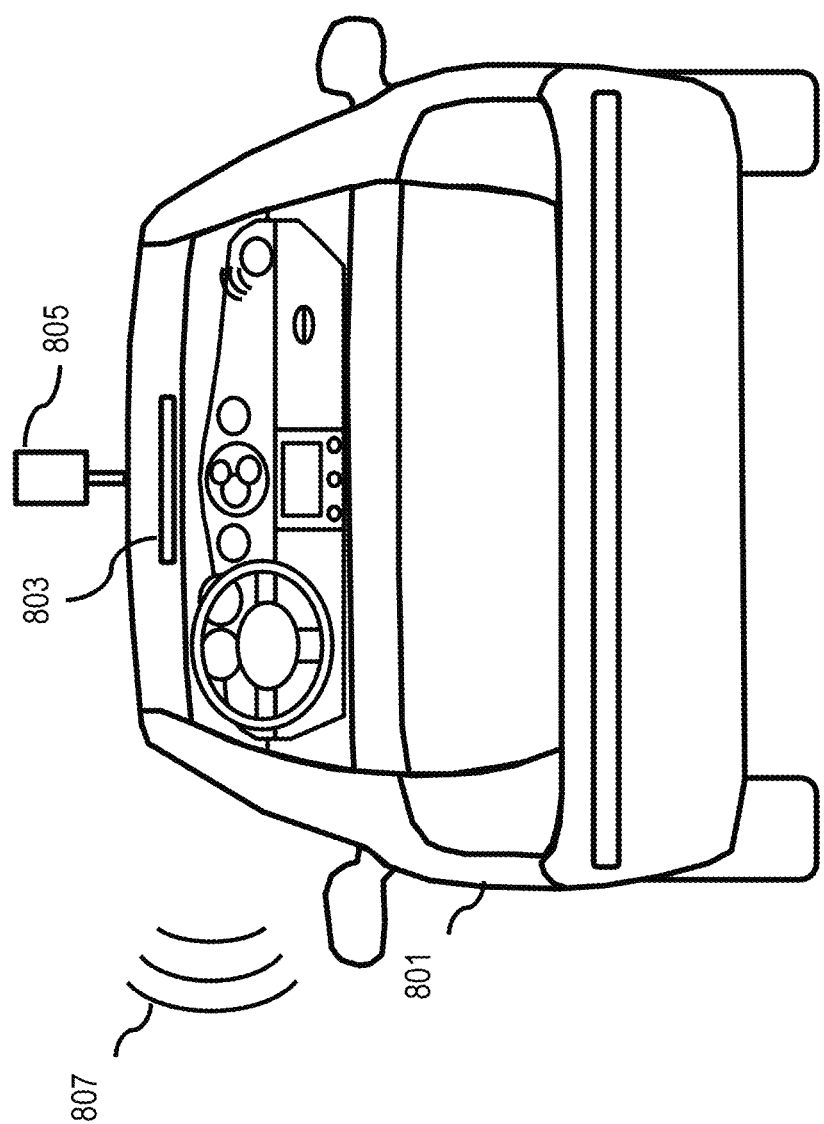
FIG. 8 is a diagram illustrating an example of a vehicle equipped with sensors to support machine learning of physical dividers, according to one embodiment.

FIG. 8 is a diagram illustrating an example of a vehicle 801 equipped with sensors to support machine learning of physical dividers, according to one embodiment. As shown, a vehicle 801 is equipped with a camera sensor 803, a LiDAR sensor 805, and a radar sensor 807. Each of these sensors 803-807 are capable of sensing the presence of a physical divider 107 individually. However, each sensor 803-807 has a respective weakness. For example, LiDAR data or camera data of the physical divider 107 can be obscured if there an obstruction (e.g., another vehicle) between the vehicle 801 and the physical divider 107. Similarly, radar signals may pass through the physical divider 107 when it is made or porous material or other material that reflects radar signals poorly, have a low height, etc. These weaknesses can potentially lead to less reliable or less accurate detection of physical dividers 107.

To address the individual technical weaknesses of the sensors 803-807, the sensor data ingestion module 401, for instance, can perform in-vehicle sensor fusion of the physical divider 107 or structural separator. In other words, the sensor data ingestion module 401 can use multiple different sensors 803-807 to determine a consistency of detection of the physical divider 107 among the different sensors 803-807. For example, with respect to cross-sensor consistency, the sensor data is collected from at least two sensors of the vehicle. Then the various sensed characteristics of the detected physical divider 107 can be compared (e.g., location from the vehicle 801, detected height of the physical divider 107, etc.) for consistency (e.g., by calculating a percent difference or equivalent). In addition, because each of the sensors are capable of sampling multiple times per second or faster, a distribution of the cross-sensor consistency can be determined from the sampling set. In one embodiment, the cross-sensor consistency distribution can be one parameter retrieved by the sensor data ingestion module 401 as feature indicating a consistency of detecting the physical divider 107 between each of at least two of the sensors 803-807.

In one embodiment, the sensor data ingestion module 401 can also use sensor data from multiple vehicles traveling on the same road segment to determine additional attributes or features for machine learning. For example, the sensor data ingestion module 401 can process the sensor data from a plurality of vehicles traveling the segment of the road to determine or calculate a derivative feature. A derivative feature refers to any feature or attribute that can be calculated or processed from the raw data from multiple vehicles (e.g., not directly sensed by a sensor 803-807). For example, the derivative feature can include, but is not limited to, the number of positive observations of the physical divider 107 by unique vehicles traveling the road segment. In one embodiment, this number of positive observations can be normalized by the total number of drives or vehicles that passed the given segment.

In an embodiment where the map data is used alone or in combination with the sensor data, the map data module 403 can retrieve requested map data for a road segment of interest by performing a location-based query of the geographic database 111 or equivalent. By way of example, the map data can include any attribute of the road segment or corresponding map location stored in the geographic database 111. The retrieved map data can include, but is not limited to, a functional class, a speed limit, a presence of a road sign (e.g., school zone sign), a bi-directionality of the road, a number of lanes, a speed category, a distance to a nearby point of interest, or a combination thereof. The map data can also include the presence of non-vehicular travel lanes on the road segment (e.g., sidewalks, bicycle paths, etc.).

In one embodiment, the sensor data ingestion module 401 can retrieve sensor data directly from vehicles with connected communications capabilities (e.g., cellular or other wireless communications equipped vehicles) or from an Original Equipment Manufacturer (OEM) provider (e.g., automobile manufacturer) operating an OEM platform (e.g., a services platform 123) that collects sensor data from vehicles manufactured by or otherwise associated with the OEM. The retrieval of the sensor data and/or the map data can occur in real-time or near real-time, continuously, periodically, according to a schedule, on demand, etc.

In one embodiment, the sensor data can be provided as location trace data in which each sensor data sampling point is associated with location coordinates of the collection vehicle. The location coordinates can be determined from location sensors (e.g., GPS/satellite-based location sensors or equivalent) and recorded with the sensor data. In this case, the sensor data ingestion module 401 can perform a map matching (e.g., using any map matching technique known in the art) of the location data of each sensor data sampling point to identify which road segment the sensor data sampling point belongs. In other words, each location trace is associated with segments of map road links and transformed into sensor data observations for a particular segment of the road link. For example, the data ingestion module 401 can use a path-based map matching algorithm by calculating the collection vehicle's direction of travel from the time stamp and GPS points present in the retrieved sensor data.

After retrieval of the map data, sensor data, and/or derivative feature, the divider classification module 405 can process the data to extract a feature vector comprising the attributes indicated in the map data, the sensor data, the derivative feature, or a combination thereof. This feature vector can then be provided as an input to the machine learning model 115. When used for training the machine learning model 115, the feature vector can be part of a training data set. When used for actual prediction, the feature vector is provided as an input to a trained machine learning model 115 for predicting the presence/absence of a physical divider 107 at a corresponding segment of interest for output as a PD signal stream of the reporting vehicle. This out can then be used in the embodiments of the process 500 of FIG. 5 described above for detecting physical dividers based on positive and negative observations.

With respect to the training use case, after creating the feature vector as described above for inclusion in a training data set, the divider classification module 405 retrieves ground truth data about a physical divider 107 for the segment of the road (step 703). The ground truth data, for instance, indicates a true presence or a true absence of the physical divider 107 on the segment of the road of interest. This ground truth data can be collected using traditional or equivalent techniques (e.g., manual human annotation of a collected sensor data observation to indicate presence or absence of a physical divider 107 and/or its type or characteristics). For example, a map service provider can operate a fleet of map data collection vehicles that can more sophisticated, accurate, or different types of sensors (e.g., radar, cameras, LiDAR, etc.) than would normally be available in customer vehicles. As described above, the physical divider is a fixed roadside or a median structure that separates different traffic flow directions or types (e.g., vehicular traffic vs. non-vehicular traffic). In one embodiment, only segments for which ground truth data is collected or otherwise available are selected for training the machine learning model.

In one embodiment, when independent ground truth data is not available or otherwise not used, the divider classification module 405 can use the underlying sensor data individually to estimate whether a physical divider is present or absent on the corresponding road segment. For example, image recognition can be performed on camera sensor data collected from a vehicle traveling the road segment. If image recognition results in detecting the presence or absence a physical divider in the image data, the results can be used as pseudo-ground truth data to train the machine learning classifier. In this way, when operating with independent ground truth data, map and sensor data collected from one road segment can be used to train the machine learning model 115 to predict the presence or absence of physical dividers on other road segments.

In step 705, the divider classification module 405 processes the map data, the sensor, or a combination thereof and the ground truth data to train the machine learning model 115 to predict the physical divider using the map data, the sensor data, or a combination thereof as an input. As previously discussed, the machine learning model 115 can be based on any supervised learning model (e.g., Random Forest, Decision Tree, Neural Net, Deep Learning, logistic regression, etc.). For example, in the case of a neural network, the machine learning model 115 can consist of multiple layers or collections of one or more neurons (e.g., processing units of the neural network) corresponding to a feature or attribute of the input data (e.g., the feature vector generated from the map and/or vehicular sensor data as described above).

During training, the divider classification module 405 uses a learner module that feeds feature vectors from the training data set (e.g., created from map and/or sensor data as described above) into the machine learning model 115 to compute a predicted matching feature (e.g., physical divider and/or other related characteristic to be predicted) using an initial set of model parameters. For example, the target prediction for the machine learning model 115 can be whether there is a physical divider present for a given segment (e.g., 5-meter segment) of a road of interest. In one embodiment, the machine learning model 115 can also be used to model or predict shape, distance from vehicle to the physical divider (e.g., from a vehicle reference point such as the rear axle), and/or other attributes of the physical divider 107 if the ground truth data contains attributes or feature labels.

In addition or alternatively, the machine learning model 115 can be used to predict a road characteristic related to the physical divider. For example, the road characteristic related to the physical divider can include, but is not limited to, a probability of oncoming traffic (OPPO), a presence of vulnerable road users (VRU), or a combination thereof. In one embodiment, the prediction can be a binary prediction (e.g., physical divider/OPPO/VRU present or physical divider/OPPO/VRU absent). In another embodiment, prediction can be a probability of the physical divider/OPPO/VRU being present or absent (e.g., spanning a numerical range from 0 to 1, with 0 being no probability and 1 being the highest probability).

The learner module then compares the predicted matching probability and the predicted feature to the ground truth data (e.g., the manually marked feature labels) in the training data set for each sensor data observation used for training. In addition, the learner module computes an accuracy of the predictions for the initial set of model parameters. If the accuracy or level of performance does not meet a threshold or configured level, the learner module incrementally adjusts the model parameters until the model generates predictions at a desired or configured level of accuracy with respect to the manually marked labels of the ground truth data. In other words, a "trained" machine learning model 115 is a model with model parameters adjusted to make accurate predictions with respect to the training data set and ground truth data.

In step 707, the divider classification module 405 uses the trained machine learning model 115 to a generate a PD signal stream for the physical divider platform 113 to generate a physical divider overlay of a map representation of a road network using the embodiments of the process 500 of FIG. 5 described above. For example, the divider classification module 405 can interact with the sensor data ingestion module 401 and map data module 403 receive sensor data observations from OEM providers and/or vehicles traveling in the road network. The observations can then be used an input into the trained machine learning model 115 as discussed in more detailed below with respect to FIG. 9. In one embodiment, the physical divider overlay indicates a presence or an absence of one or more physical dividers in the road network of the map representation. In one embodiment, the physical divider overlay can also include other data related to a presence or an absence of one or more physical dividers in the road network of the map representation such as a probability of oncoming traffic (OPPO), a presence of vulnerable road users (VRU), or a combination thereof as previously discussed.

In other words, in one embodiment, given the training data above, the physical divider platform 113 can run a batch process (e.g., every 24 hours or any other configured time interval) and extract the feature vectors as described above, and pass the feature vectors to the already trained machine learning model 115. The trained machine learning model 115 will output positive and/or negative observations of physical dividers for a road segment being analyzed.

In one embodiment, the data publication module 407 can then publish the physical divider overlay in the geographic database 111 or equivalent for access by end users (e.g., OEMs, vehicles, etc.).

Figure 9:
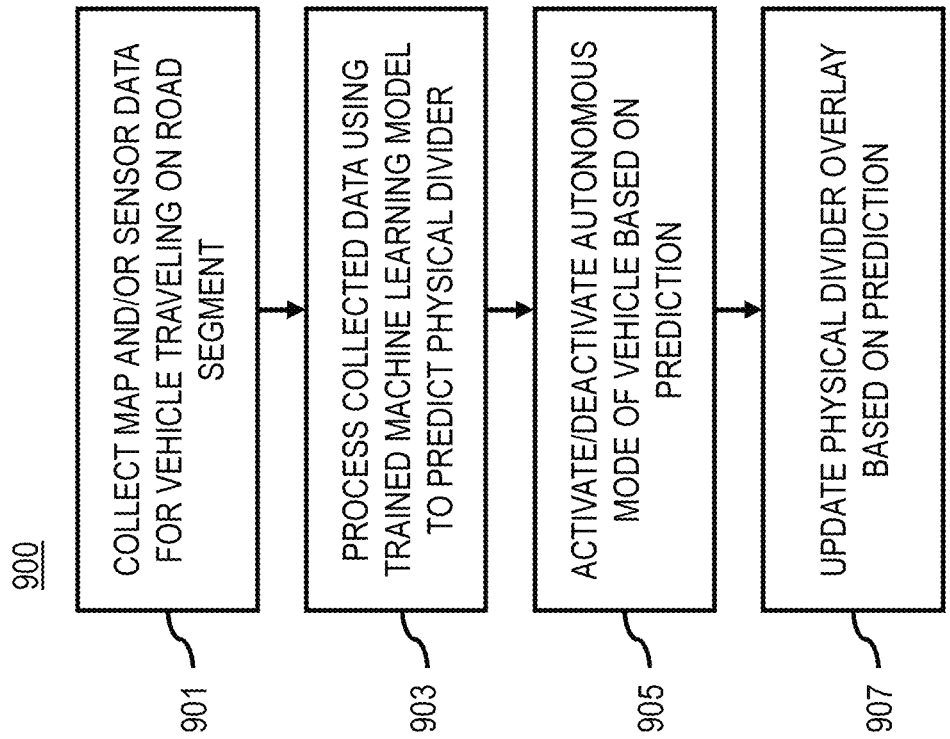
FIG. 9 is a flowchart of a process for predicting physical dividers using a trained machine learning model, according to one embodiment.

FIG. 9 is a flowchart of a process for predicting physical dividers using a trained machine learning model, according to one embodiment. In various embodiments, the physical divider platform 113, physical divider module 119, and/or any of the modules 401-409 may perform one or more portions of the process 900 and may be implemented in, for instance, a chip set including a processor and a memory as shown in FIG. 14. As such, physical divider platform 113, physical divider module 119, and/or any of the modules 401-409 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps. In one embodiment, the process 900 provides additional detail regarding the use of the machine learning model 115 trained according to the process 700 of FIG. 7 to generate a PD signal stream or equivalent physical divider observations.

In step 901, the sensor data ingestion module 401 and/or the map data module 403 collect map data, sensor data, or a combination thereof from a vehicle traveling on a road segment. This step is equivalent to step 701 of the process 700 described above. However, in this use case, the road segment of interest is a road segment for which a prediction of a physical divider 107 or other related characteristic is requested.

In step 903, the divider classification module 405 processes the map data, the sensor data, or a combination thereof using a machine learning model to predict a presence or an absence of a potential physical divider on the target road segment. In one embodiment, the map data, sensor data, and/or any derivative feature determined therefrom (e.g., the derivative feature as described above in process 700) are used to generate a feature vector of the attributes of the collected data as an input into the trained machine learning model 115. In one embodiment, the machine learning model 115 is trained using training map data, training sensor data, or a combination thereof and ground truth data regarding a true presence or a true absence of a reference physical divider as described above with respect to the process 700.

In step 905, the vehicle control module 409 activates or deactivates an autonomous driving mode of the vehicle based on the predicted presence or the predicted absence of the physical divider (e.g., predicted locally via the process 900 or retrieved from the physical divider overlay created using the process 500 of FIG. 5 from positive and negative physical divider observations). In addition or alternatively, the vehicle control module 409 can present a notification to the driver or occupant of the vehicle prior to activating or deactivating the autonomous mode. For example, the notification can alert the driver that a change in the autonomous mode will occur shortly (e.g., within a specified period of time). In another example, the notification can provide the driver an option to accept or reject the pending change in autonomous driving mode, or select other alternatives (e.g., reroute the vehicle to road segments with physical dividers, etc.). In one embodiment, the autonomous driving mode is deactivated based on the predicted presence and activated based on the predicted absence of the physical divider. By way of example, the vehicle can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles that are classified in any of the levels of automation (levels 0-4) discussed above. For example, in the case of autonomous modes of operation, the vehicle can automatically react to detected physical dividers, OPPO, VRU, etc. (e.g., by automatically rerouting, slowing down, etc.). Even in the case of completely manual driving (e.g., level 0), the vehicle can present an alert or notification of any detected physical dividers, OPPO, VRU, etc. to provide greater situational awareness and improve safety for drivers.

In another use case of a physical divider prediction, in addition to or instead of autonomous vehicle control, the data publication module 407 can initiate an update of physical divider overlay of a map database based on the predicted presence or the predicted absence of the physical divider, OPPO, VRU, etc. on the road segment (step 907). For example, if the segment has been previously unmapped, the predicted physical divider/OPPO/VRU can be transmitted for possible inclusion in physical divider overlay of the geographic database 111. The physical divider platform 113 can use any criteria for determining whether a new physical divider prediction should be incorporated into an existing physical divider overlay. For example, if the report is from a trusted vehicle (e.g., a mapping vehicle operated by a map provider), a single prediction can be used to update the overlay. If the report is from a user vehicle, the physical divider platform 113 may update the overlay only if the report meets predetermined criteria (e.g., confirmed by a predetermined number of other user vehicles, has calculated probability above a threshold value, etc.).

Figure 10A:
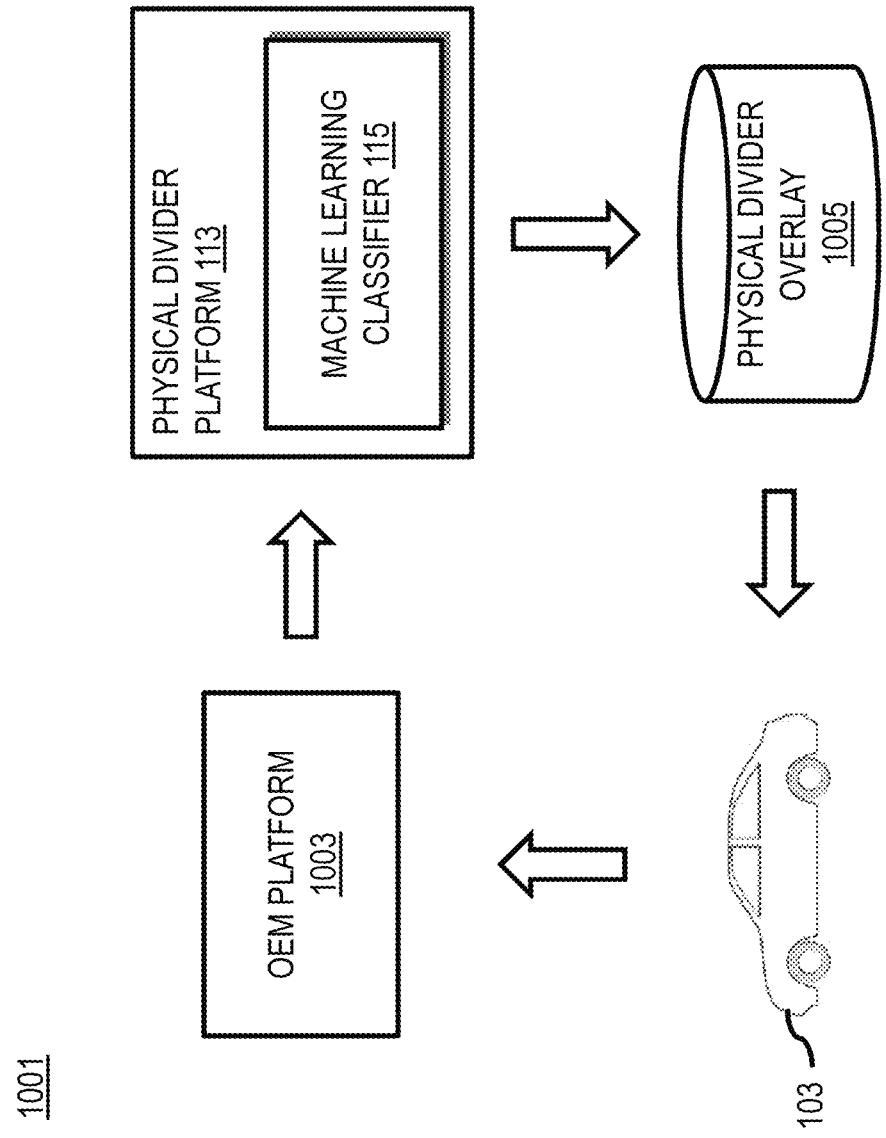

FIGS. 10A and 10B are diagrams of example architectures for detecting physical dividers, according to one embodiment. FIG. 10A illustrates an example architecture 1001 in which the machine learning model 115 is instantiated on a network component (e.g., the physical divider platform 113). In this way, the processing needed by the machine learning model 115 is provided on the server side, where computing resources (e.g., processing power, memory, storage, etc.) is generally greater than at a local component (e.g., the vehicle 103).

Under the architecture 1001, an OEM platform 1003 (e.g., operated by automobile manufacturer) collects sensor data observations from vehicles as they travel in a road network. The OEM platform 1003 sends the observations to the physical divider platform 113 (e.g., typically operated by a map or other service provider) for ingestion and archival. The physical divider platform 113 (e.g., where the trained machine learning model 115 is instantiated) then processes the received observations to predict physical dividers, OPPO, VRU, etc. These physical divider/OPPO/VRU predictions are then fused with map attribute information to produce the physical divider overlay 1005. The physical divider platform 113 can then publish the physical divider overlay 1005 for delivery to the vehicle 103 either directly or through the OEM platform 1003.

FIG. 10B illustrates an alternative architecture 1021 in which no physical divider overlay is delivered to the vehicle 103. Instead, a trained machine learning model 115 is instantiated at a local component or system of a vehicle 103 traveling the road network. In this way, the local component uses the machine learning model 115 to provide a local prediction of the physical divider (e.g., physical divider predictions 1023 as, for instance, a PD signal stream) based on locally collected map and/or sensor data. In one use case, the local prediction of the physical divider is provided to the physical divider platform 113 as a PD signal stream or equivalent to facilitate detecting a physical divider on a road segment according to the embodiments described herein.

As shown, to enable this architecture 1021, the physical divider platform 113 trains the machine learning model 115 as previously described in the process 700. The physical divider platform 113 can then deliver the trained machine learning model 115 to the vehicle 103 either directly or through the OEM platform 1025. A local system or component of the vehicle 103 then executes an instance of the trained machine learning model 115 to make physical divider/OPPO/VRU predictions locally at the vehicle 103. In this way, the vehicle is able detect or map physical dividers on the segments on which it is traveling when a physical divider overlay is not available or when the vehicle does not have communications to network-side components such as the physical divider platform 113 as it travels. In one embodiment, as new training data is collected, an updated trained machine learning model 115 can be delivered to the vehicle 103 as needed, periodically, etc.

Figure 11A:
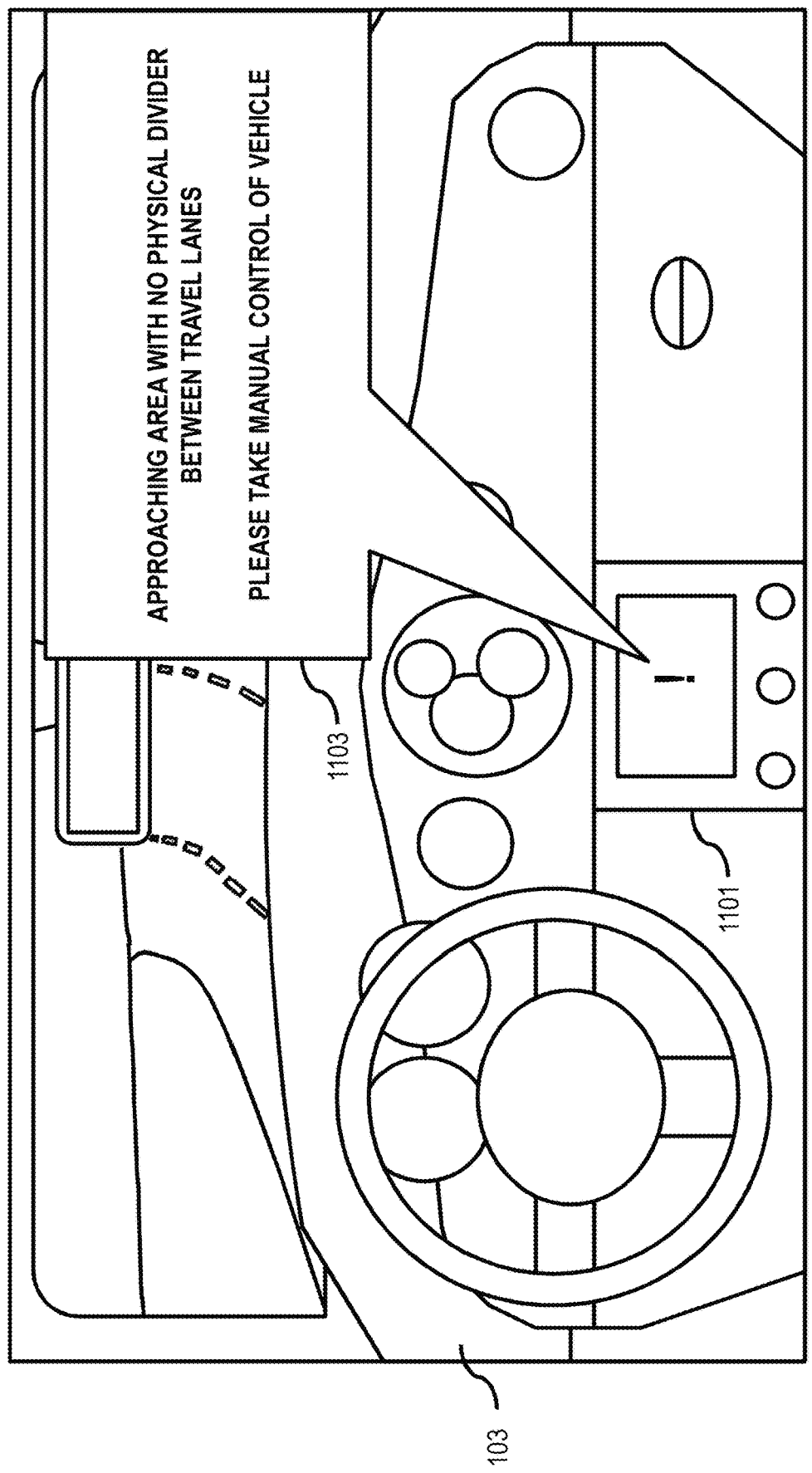
FIGS. 11A and 11B are diagrams of example user interfaces based on physical dividers predicted by machine learning, according to on embodiment.
Figure 11B:
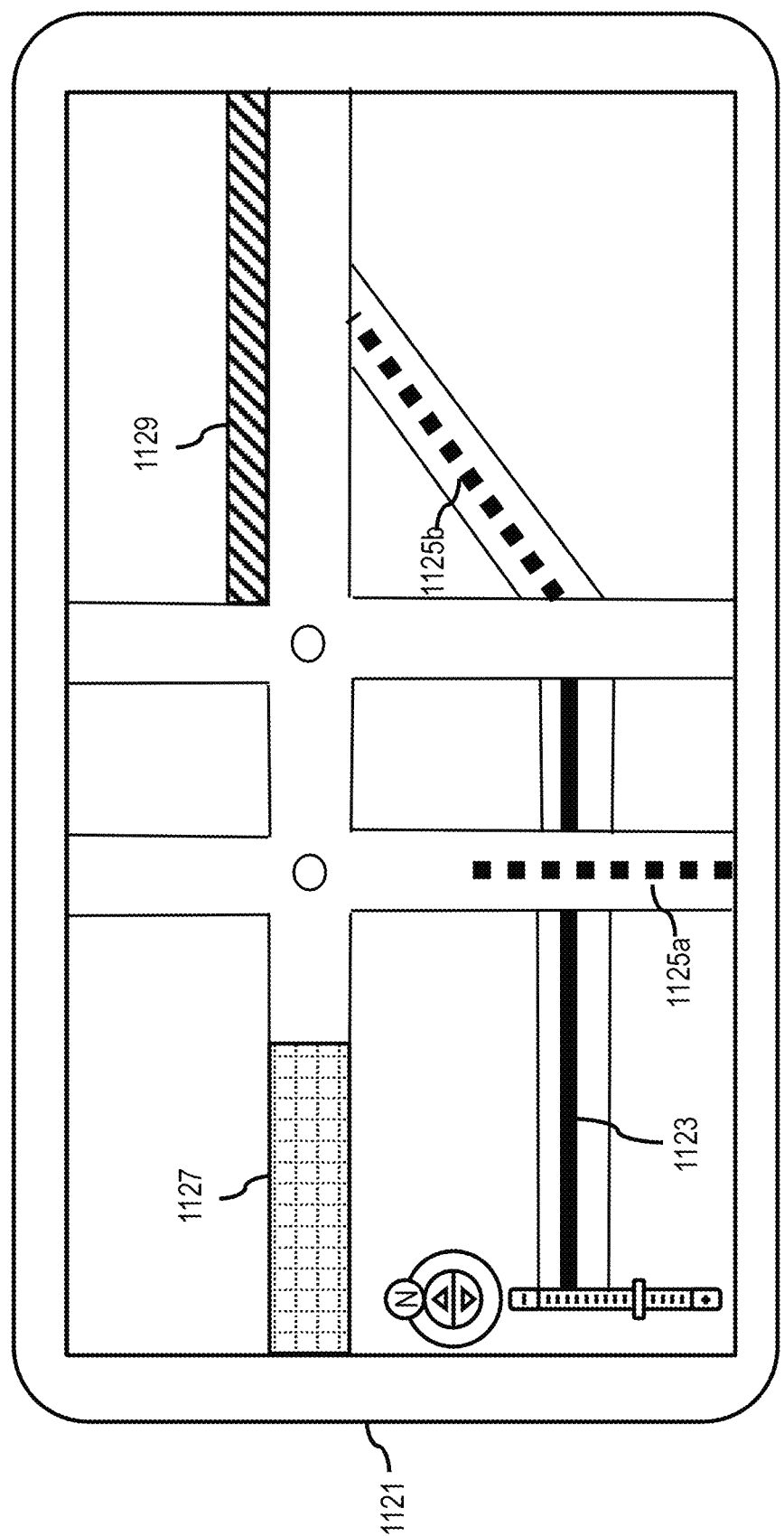

FIGS. 11A and 11B are diagrams of example user interfaces based on physical dividers predicted by machine learning, according to on embodiment. In the example of FIG. 11A, the vehicle 103 is traveling on a road segment that has not been previously mapped for the presence of any physical dividers between opposite traffic flow lanes. The vehicle 103 also is currently operating in autonomous driving mode. As the vehicle 103 approaches the segment, the vehicle sensors (e.g., camera, radar, etc.) collect sensor data. At the same time, the map data (e.g., functional class, speed category, etc.) about the road segment is also determined. A vehicle system 1101 including trained machine learning model 115 (e.g., trained according to the embodiments described herein) then processes the map and sensor data to make a physical divider prediction, and/or can query the physical divider information from the physical divider overlay generated as described above. In this example, the machine learning model 115 predicts that there is no physical divider on the segment. This prediction then triggers the vehicle system 1101 to present an alert message 1103 to indicate that that the vehicle 103 is approaching an area with no physical divider and instructs the driver to take manual control for the segment. In addition, the vehicle system 1101 can deactivate the autonomous driving mode (e.g., following a period of time after presenting a notification such as the alert message 1103).

FIG. 11B is a diagram illustrating an example user interface presenting a physical divider overlay, according to one embodiment. As shown, a display device 1121 (e.g., connected to a vehicle or personal navigation system) presents a mapping display on which a physical divider overlay (e.g., generated according to the various embodiments described herein) is superimposed. In this example, the physical divider overlay includes information on which road segments have ground truth mapped physical dividers (e.g., segments indicated with a solid line 1123) as well as physical dividers determined from positive and negative physical divider observations according to the embodiments described herein and/or predicted by a trained machine learning model 115 (e.g., segments indicated with dashed lines 1125a and 1125b). In addition, the physical overlay, includes data on segments with observed or predicted OPPO (e.g., indicated by shaded area 1127) as well as observed or predicted VRU (e.g., indicated by shaded area 1129).

Returning to FIG. 1, in one embodiment, the physical divider platform 113 has connectivity over a communication network 125 to the services platform 121 (e.g., an OEM platform) that provides one or more services 123 (e.g., sensor data collection services). By way of example, the services 123 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 121 uses the output (e.g. physical divider predictions) of the physical divider platform 113 to provide services such as navigation, mapping, other location-based services, etc.

In one embodiment, the physical divider platform 113 may be a platform with multiple interconnected components. physical divider platform 113 may include multiple servers, intelligent networking devices, computing devices, components and corresponding software for providing parametric representations of lane lines. In addition, it is noted that the physical divider platform 113 may be a separate entity of the system 100, a part of the one or more services 123, a part of the services platform 121, or included within the vehicle 103 (e.g., a physical divider module 119).

In one embodiment, content providers 127a-127m (collectively referred to as content providers 127) may provide content or data (e.g., including geographic data, parametric representations of mapped features, etc.) to the geographic database 111, the physical divider platform 113, the services platform 121, the services 123, and the vehicle 103. The content provided may be any type of content, such as map content, textual content, audio content, video content, image content, etc. In one embodiment, the content providers 127 may provide content that may aid in the detecting and classifying of physical dividers or other related characteristics (e.g., OPPO, VRU, etc.). In one embodiment, the content providers 127 may also store content associated with the geographic database 111, physical divider platform 113, services platform 121, services 123, and/or vehicle 103. In another embodiment, the content providers 127 may manage access to a central repository of data, and offer a consistent, standard interface to data, such as a repository of the geographic database 111.

By way of example, the physical divider module 119 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the physical divider module 119 can support any type of interface to the user (such as "wearable" circuitry, etc.). In one embodiment, the physical divider module 119 may be associated with the vehicle 103 or be a component part of the vehicle 103.

In one embodiment, the vehicle 103 is configured with various sensors 117 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for detecting physical dividers according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the physical divider platform 113, services platform 121, services 123, vehicle 103, and/or content providers 127 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
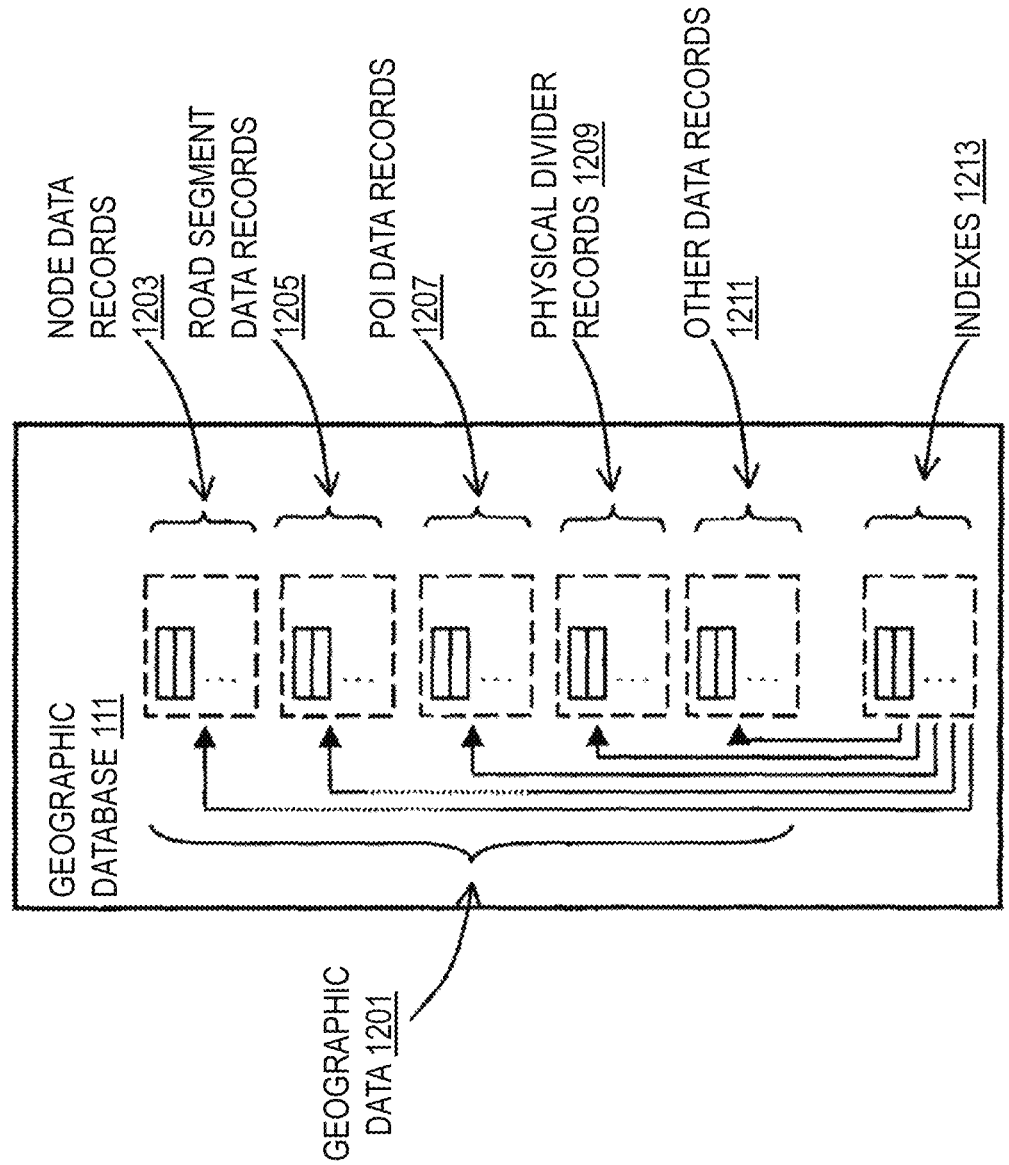
FIG. 12 is a diagram of a geographic database, according to one embodiment.

FIG. 12 is a diagram of a geographic database, according to one embodiment. In one embodiment, the geographic database 111 includes geographic data 1201 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 1203, road segment or link data records 1205, POI data records 1207, physical divider records 1209, other records 1211, and indexes 1213, for example. More, fewer or different data records can be provided. In one embodiment, additional data records (not shown) can include cartographic ("carto") data records, routing data, and maneuver data. In one embodiment, the indexes 1213 may improve the speed of data retrieval operations in the geographic database 111. In one embodiment, the indexes 1213 may be used to quickly locate data without having to search every row in the geographic database 111 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points corresponding to the respective links or segments of the road segment data records 1205. The road link data records 1205 and the node data records 1203 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 1207. The geographic database 111 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In one embodiment, the geographic database 111 can also include physical divider records 1209 for storing predicted physical dividers, OPPO, VRU, and/or other related road characteristics. The predicted data, for instance, can be stored as attributes or data records of a physical divider overlay, which fuses with the predicted attributes with map attributes or features. In one embodiment, the physical divider records 1209 can be associated with segments of a road link (as opposed to an entire link). It is noted that the segmentation of the road for the purposes of physical divider prediction can be different than the road link structure of the geographic database 111. In other words, the segments can further subdivide the links of the geographic database 111 into smaller segments (e.g., of uniform lengths such as 5-meters). In this way, physical dividers/OPPO/VRU can be predicted and represented at a level of granularity that is independent of the granularity or at which the actual road or road network is represented in the geographic database 111. In one embodiment, the physical divider records 1209 can be associated with one or more of the node records 1203, road segment records 1205, and/or POI data records 1207; or portions thereof (e.g., smaller or different segments than indicated in the road segment records 1205) to provide situational awareness to drivers and provide for safer autonomous operation of vehicles. In this way, the predicted physical dividers/OPPO/VRU/etc. stored in the physical divider records 1209 can also be associated with the characteristics or metadata of the corresponding records 1203, 1205, and/or 1207.

In one embodiment, the geographic database 111 can be maintained by the content provider 127 in association with the services platform 121 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 111 is stored as a hierarchical or multilevel tile-based projection or structure. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting physical dividers on a road segment may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
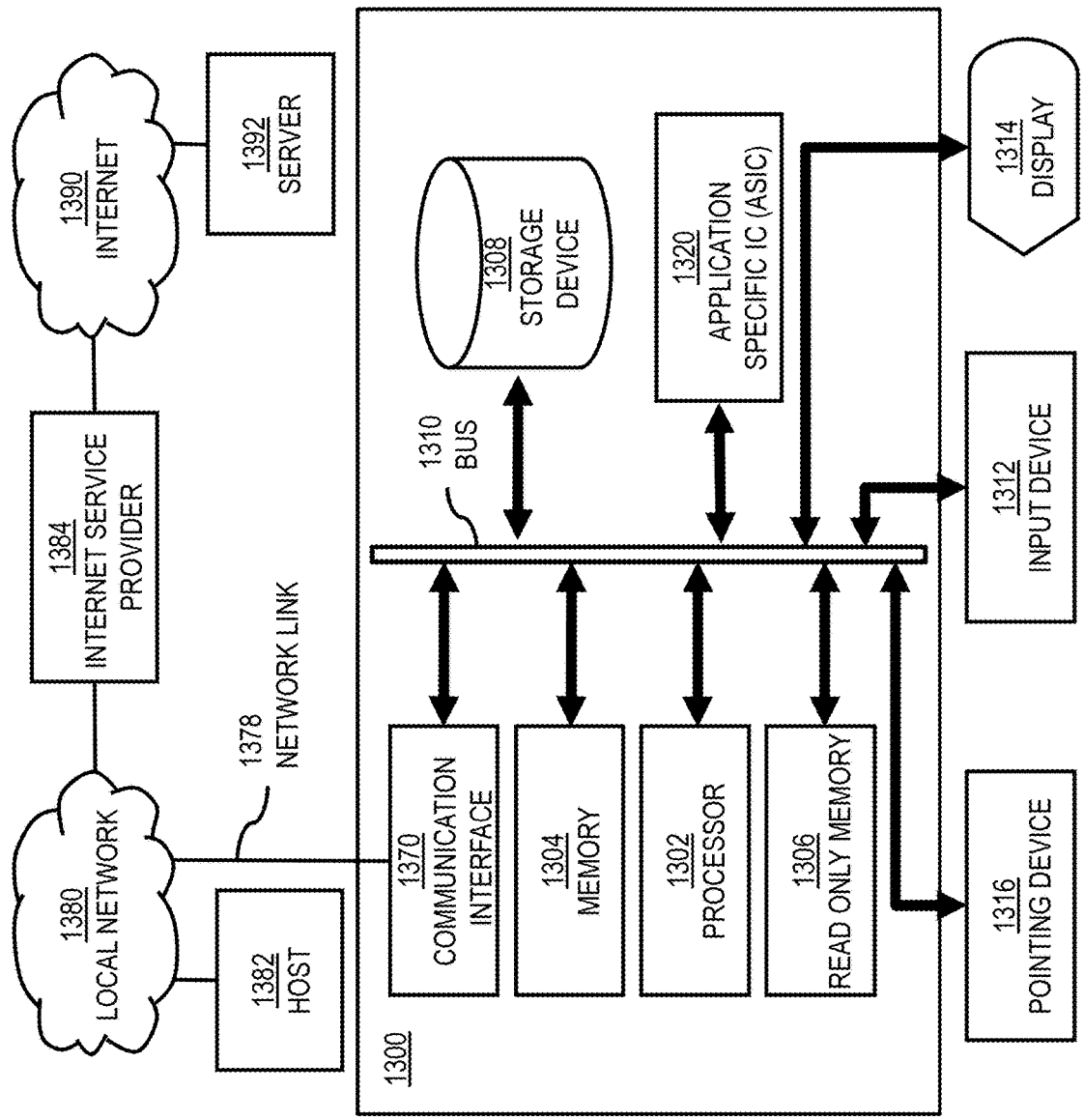
FIG. 13 is a diagram of hardware that can be used to implement an embodiment.

FIG. 13 illustrates a computer system 1300 upon which an embodiment may be implemented. Computer system 1300 is programmed (e.g., via computer program code or instructions) to detect physical dividers on a road segment as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to detecting physical dividers on a road segment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for detecting physical dividers on a road segment. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for detecting physical dividers on a road segment, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general, the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 125 for detecting physical dividers on a road segment.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 14 illustrates a chip set 1400 upon which an embodiment may be implemented. Chip set 1400 is programmed to detect physical dividers on a road segment as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to detect physical dividers on a road segment. The memory 1405 also stores the data associated with or generated by the execution of the inventive steps.

Figure 15:
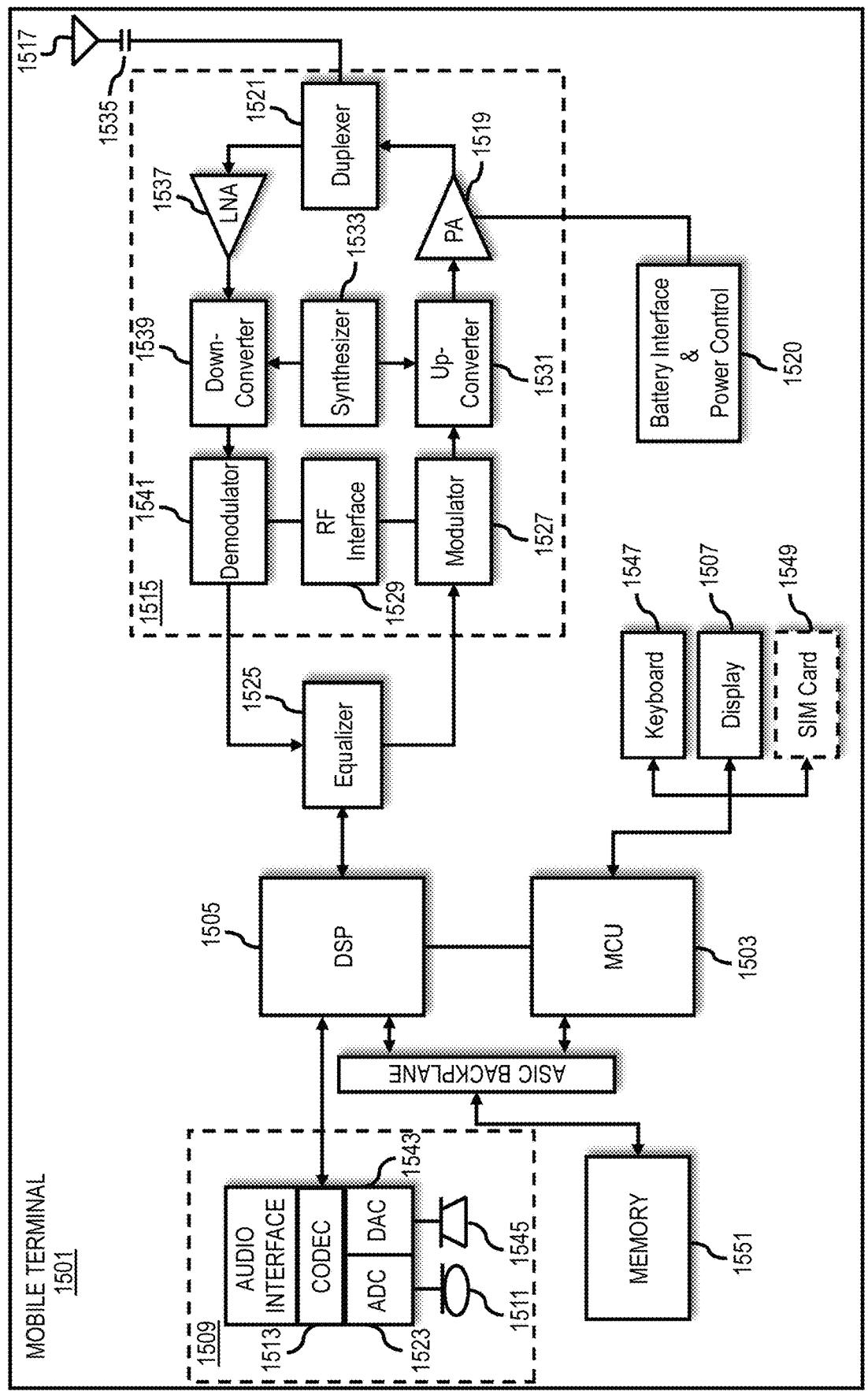
FIG. 15 is a diagram of a mobile terminal (e.g., handset or vehicle or part thereof) that can be used to implement an embodiment.

FIG. 15 is a diagram of exemplary components of a mobile terminal 1501 (e.g., handset, vehicle or part thereof, etc.) capable of operating in the system of FIG. 1, according to one embodiment. Generally, a radio receiver is often defined in terms of front-end and back-end characteristics.

The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to detect physical dividers on a road segment. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for detecting a presence of a physical divider on a road segment comprising:
   determining a number of positive observations of the physical divider on the road segment based on sensor data collected from one or more vehicles traveling the road segment;
   determining a number of negative observations of the physical divider on the road segment based on the sensor data;
   calculating a probability of the presence of the physical divider based on the number of the positive observations and the number of the negative observations; and
   updating map data for the road segment to indicate the presence of the physical divider based on determining that the probability of the presence of the physical divider is greater than a threshold value.

2. The method of claim 1, further comprising:
   calculating the threshold value based on ground truth data indicating a known presence, a known absence, or a combination thereof of a plurality of reference physical dividers on a plurality of reference road segments.

3. The method of claim 1, further comprising:
   filtering the positive observations, the negative observations, or a combination thereof based on determining that the one or more vehicles are farther than a distance threshold from the physical divider on the road segment,
   wherein the number of the positive observations, the number of the negative observations, or a combination thereof is determined based on the filtered positive observations, the filtered negative observations, or a combination thereof.

4. The method of claim 3, wherein the distance threshold is based on physical dimensions of a travel lane adjacent to the physical divider.

5. The method of claim 1, wherein the sensor data comprises a plurality of probe trajectories including a plurality of physical divider flags sequenced in time.

6. The method of claim 5, wherein the positive observations are extracted by segmenting a portion of the plurality of probe trajectories that corresponds to the road segment, and wherein the portion begins with a positive flag and ends with a negative flag as determined from the plurality of physical divider flags.

7. The method of claim 5, wherein the negative observations are extracted by segmenting a portion of the plurality of probe trajectories that corresponds to the road segment, and wherein the portion begins with a negative flag and ends with a positive flag as determined from the plurality of physical divider flags.

8. The method of claim 1, wherein the road segment is one segment of a plurality of segments of a road link, and wherein the presence of the physical divider for each of the plurality of segments is determined independently.

9. The method of claim 1, wherein the presence of the physical divider is determined independently for a left side, a right side, or a combination thereof of the road segment.

10. An apparatus for detecting a presence of a physical divider on a road segment comprising:
    at least one processor; and
    at least one memory including computer program code for one or more programs,
    the at least one memory and the computer program code configured to, with the at least one processor, cause the apparatus to perform at least the following,
    determine a number of positive observations of the physical divider on the road segment and a number of negative observations of the physical divider on the road segment;
    calculate a probability of the presence of the physical divider based on the number of the positive observations and the number of the negative observations; and
    update map data for the road segment to indicate the presence of the physical divider based on determining that the probability of the presence of the physical divider is greater than a threshold value.

11. The apparatus of claim 10, wherein the apparatus is further caused to:
    calculate the threshold value based on ground truth data indicating a known presence, a known absence, or a combination thereof of a plurality of reference physical dividers on a plurality of reference road segments.

12. The apparatus of claim 10, wherein the apparatus is further caused to:
    filter the positive observations, the negative observations, or a combination thereof based on determining that one or more corresponding vehicles are farther than a distance threshold from the physical divider on the road segment when the positive observations, the negative observations, or a combination thereof were collected,
    wherein the number of the positive observations, the number of the negative observations, or a combination thereof is determined based on the filtered positive observations, the filtered negative observations, or a combination thereof.

13. The apparatus of claim 10, wherein the number of the positive observations and the number of the negative observations are based on sensor data collected from one or more vehicles traveling the road segment, and wherein the sensor data comprises a plurality of probe trajectories including a plurality of physical divider flags sequenced in time.

14. The apparatus of claim 13, wherein the positive observations are extracted by segmenting a portion of the plurality of probe trajectories that corresponds to the road segment, and wherein the portion begins with a positive flag and ends with a negative flag as determined from the plurality of physical divider flags.

15. The apparatus of claim 13, wherein the negative observations are extracted by segmenting a portion of the plurality of probe trajectories that corresponds to the road segment, and wherein the portion begins with a negative flag and ends with a positive flag as determined from the plurality of physical divider flags.

16. A non-transitory computer-readable storage medium detecting a presence of a physical divider on a road segment, carrying one or more sequences of one or more instructions which, when executed by one or more processors, cause an apparatus to perform:
    determining a number of positive observations of the physical divider on the road segment and a number of negative observations of the physical divider on the road segment;
    calculating a probability of the presence of the physical divider based on the number of the positive observations and the number of the negative observations; and
    updating map data for the road segment to indicate the presence of the physical divider based on determining that the probability of the presence of the physical divider is greater than a threshold value.

17. The non-transitory computer-readable storage medium of claim 16, wherein probability of the presence of the physical divider is calculated based on a ratio of the number of positive observations to a total number of the positive observations and the negative observations.

18. The non-transitory computer-readable storage medium of claim 16, wherein the apparatus is caused to further perform:
  calculating the threshold value based on ground truth data comprising a data on a known presence, a known absence, or a combination thereof of a plurality of reference physical dividers on a plurality of reference road segments.

19. The non-transitory computer-readable storage medium of claim 16, wherein the road segment is one segment of a plurality of segments of a road link, and wherein the presence of the physical divider for each of the plurality of segments is determined independently.

20. The non-transitory computer-readable storage medium of claim 16, wherein the presence of the physical divider is determined independently for a left side, a right side, or a combination thereof of the road segment.

* * * * *